United States Patent
Kinugawa et al.

(10) Patent No.: US 10,967,834 B2
(45) Date of Patent: *Apr. 6, 2021

(54) WORKING MACHINE, ANTI-THEFT SYSTEM FOR THE SAME, ANTI-THEFT METHOD FOR THE SAME

(71) Applicant: KUBOTA CORPORATION, Osaka (JP)

(72) Inventors: Ryosuke Kinugawa, Osaka (JP); Keisuke Miura, Osaka (JP); Keisuke Egashira, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,309

(22) Filed: Jun. 6, 2018

(65) Prior Publication Data
US 2018/0354458 A1  Dec. 13, 2018

(30) Foreign Application Priority Data

Jun. 7, 2017  (JP) .............................. JP2017-112794

(51) Int. Cl.
*B60R 25/24* (2013.01)
*G07C 9/00* (2020.01)
*G07C 9/22* (2020.01)

(52) U.S. Cl.
CPC ................ *B60R 25/24* (2013.01); *G07C 9/00* (2013.01); *G07C 9/22* (2020.01); *B60R 2325/20* (2013.01);
(Continued)

(58) Field of Classification Search
CPC . B60R 2325/20; B60R 2325/30; B60R 25/04; B60R 25/24; B60W 50/08; H04L 67/12; B62D 15/029; G06F 13/00
See application file for complete search history.

(56) References Cited

U.S. PATENT DOCUMENTS

2012/0095642 A1* 4/2012 Nishida ................. H04L 9/3226
  701/31.4
2013/0116892 A1* 5/2013 Wu ......................... B60R 25/09
  701/45
(Continued)

FOREIGN PATENT DOCUMENTS

JP  2013-069124  4/2013
JP  2016-113772  6/2016
(Continued)

*Primary Examiner* — Mirza F Alam
(74) *Attorney, Agent, or Firm* — Greenblum & Bernstein, P.L.C.

(57) ABSTRACT

An anti-theft system for a working machine, includes a communication device disposed on the working machine, the communication device having a first communicator, a mobile terminal having a storage to store authentication information, and a second communicator, and a control device disposed on the working machine, the control device having an authentication processor to execute an authentication processing that determines whether to provide a permission of driving a driving portion of the working machine based on the authentication information. The first communicator sends a beacon to the mobile terminal before the authentication processing of the authentication processor is executed. The second communicator sends the authentication information to the communication device after receiving the beacon, the authentication information being stored by the storage. The authentication processor executes the authentication processing, based on the authentication information received, after the communication device receives the authentication information.

13 Claims, 16 Drawing Sheets

(52) U.S. Cl.
CPC ..... *B60R 2325/30* (2013.01); *B60R 2325/308* (2013.01)

(56) References Cited

U.S. PATENT DOCUMENTS

| | | | |
|---|---|---|---|
| 2013/0131952 A1* | 5/2013 | Komine | G05B 19/0428 |
| | | | 701/101 |
| 2017/0028850 A1* | 2/2017 | Miller | B60K 35/00 |
| 2017/0217444 A1* | 8/2017 | Chaston | B60W 50/08 |
| 2017/0232930 A1* | 8/2017 | Murar | B60R 25/24 |
| | | | 340/5.61 |

FOREIGN PATENT DOCUMENTS

| | | |
|---|---|---|
| JP | 2016-118033 | 6/2016 |
| JP | 2016-196759 | 11/2016 |

\* cited by examiner

Fig.5

| Communication device | Mobile terminal |
|---|---|
| Activation info. F1 | Activation info. G1 |
| 5400 | 5411 |
| 5401 | 5412 |
| 5402 | 5413 |
| 5410 | — |
| 5411 | |
| 5412 | |
| 5413 | |

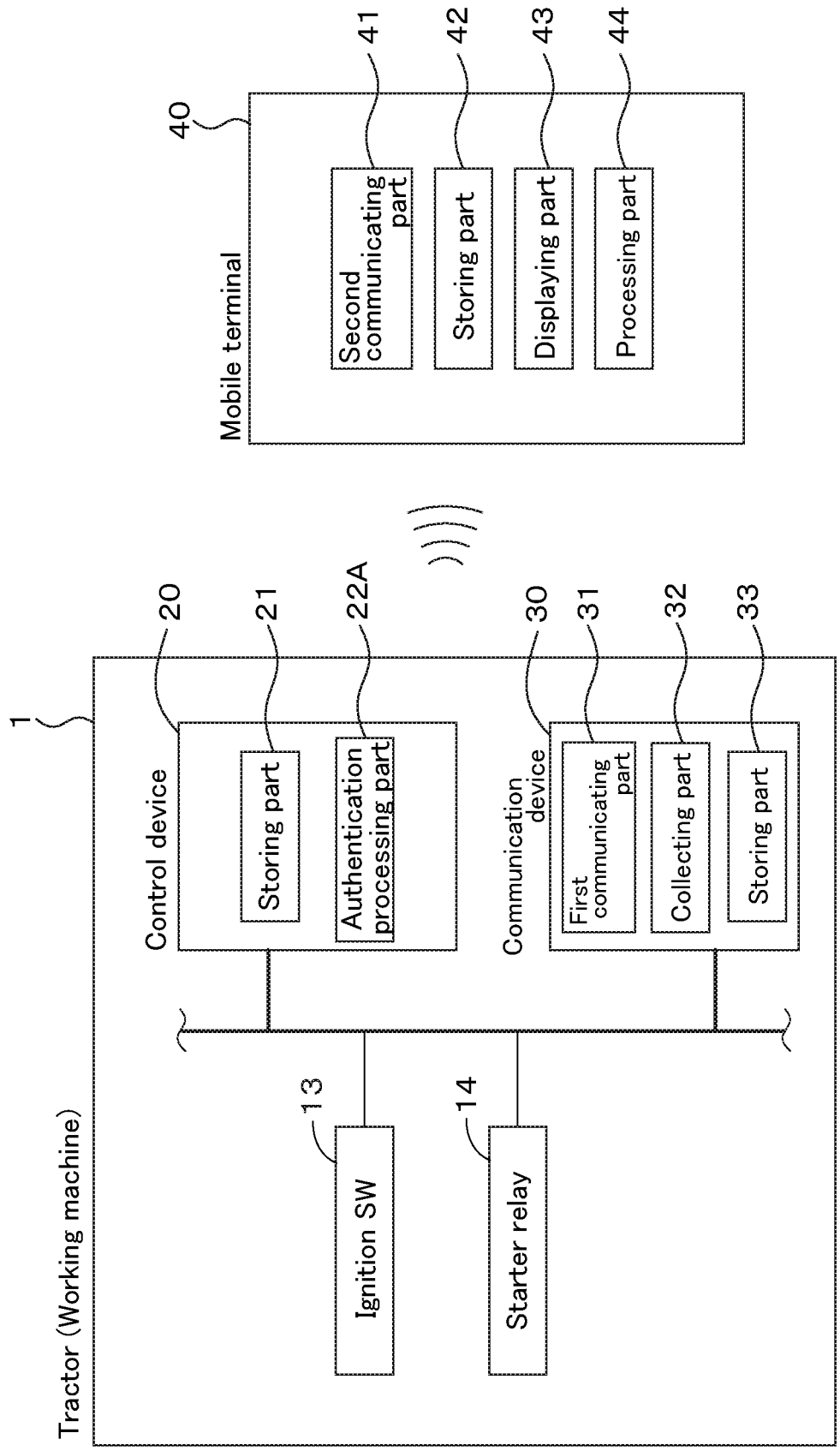

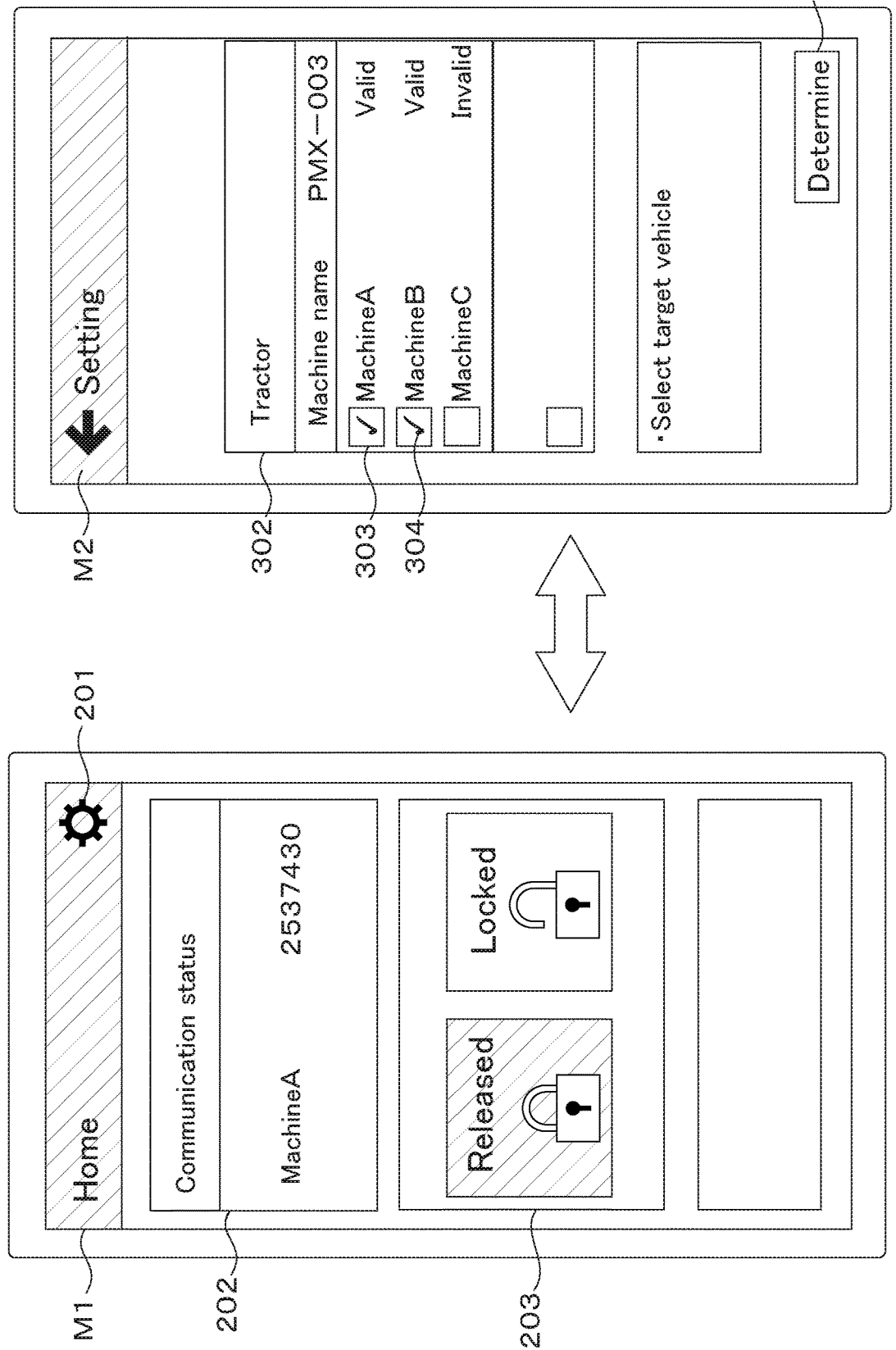

WORKING MACHINE, ANTI-THEFT SYSTEM FOR THE SAME, ANTI-THEFT METHOD FOR THE SAME

CROSS-REFERENCE TO RELATED APPLICATIONS

The present application claims priority under 35 U.S.C. § 119 to Japanese Patent Application No. 2017-112794, filed Jun. 7, 2017. The content of this application is incorporated herein by reference in their entirety.

BACKGROUND OF THE INVENTION

Field of the Invention

The present invention relates to a working machine, an anti-theft system for the working machine, and an anti-theft method for the working machine.

Discussion of the Background

A technique disclosed in Japanese Unexamined Patent Application Publication No. 2013-69124 is conventionally known as a technique for performing authentication and the like in driving a working machine. A rental management system disclosed in Japanese Unexamined Patent Application Publication No. 2013-69124 is provided with a rental management server, a mobile terminal, a rental management server, and a control device. When a rental reservation is made, the rental management server transmits individual information as a reservation key to the working machine, and then the mobile terminal transmits the individual information to the control device by wireless communication. In addition, in the rental management system, the control device allows the working machine to be controlled when the verification by the verification means is established, the verification means being configured to verify the reservation key transmitted from the rental management server with the individual information transmitted from the mobile terminal, and restricts the working machine not to be controlled when the verification is not established.

SUMMARY OF THE INVENTION

An anti-theft system for a working machine, includes a communication device disposed on the working machine, the communication device having a first communicator, a mobile terminal having a storage to store authentication information, and a second communicator, and a control device disposed on the working machine, the control device having an authentication processor to execute an authentication processing that determines whether to provide a permission of driving a driving portion of the working machine based on the authentication information. The first communicator sends a beacon to the mobile terminal before the authentication processing of the authentication processor is executed. The second communicator sends the authentication information to the communication device after receiving the beacon, the authentication information being stored by the storage. The authentication processor executes the authentication processing, based on the authentication information received, after the communication device receives the authentication information.

An anti-theft system for the working machine, includes a communication device disposed on the working machine, including a first communicator to receive authentication information, and an authentication processor to execute an authentication processing that determines whether to provide a permission of driving a driving portion of the working machine based on the authentication information, a mobile terminal having a storage to store the authentication information, and a second communicator to send the authentication information to the first communicator after receiving a beacon sent from the first communicator, and a control device to drive the driving portion when the permission is provided in the authentication processing.

An anti-theft method for a working machine, includes a beacon sending step of sending a beacon from a communication device disposed on the working machine, an authentication sending step of sending authentication information from a mobile terminal to the communication device after receiving the beacon, and a first authentication step of executing, in a control device disposed on the working machine, an authentication processing that determines whether to provide a permission of driving a driving portion of the working machine based on the authentication information received by the communication device. The beacon sending step sends the beacon to the mobile terminal before the authentication processing of the authentication processor is executed. The authentication sending step sends the authentication information to the communication device after receiving the beacon.

An anti-theft method for the working machine, includes a beacon sending step of sending a beacon from a communication device disposed on the working machine, an authentication sending step of sending authentication information from a mobile terminal to the communication device after receiving the beacon, a second authentication step of executing, in the communication device, an authentication processing that determines whether to provide a permission of driving a driving portion of the working machine based on the authentication information received by the communication device at the authentication sending step, and a driving executing step of driving the driving portion disposed on the working machine when the permission is provided in the second authentication step.

A working machine includes a communication device having a first communicator to send a beacon to a mobile terminal, the beacon requesting a mobile terminal to send authentication information, and a control device having an authentication processor to execute a authentication processing that determines whether to provide a permission of driving a driving portion based on the authentication information received by the first communicator. The first communicator sends the beacon to the mobile terminal before the authentication processing of the authentication processor is executed. The authentication processor executes the authentication processing, based on the authentication information received, after the communication device receives the authentication information.

A working machine includes a communication device including a first communicator to send a beacon to a mobile terminal, the beacon requesting a mobile terminal to send authentication information, and an authentication processor to execute an authentication processing that determines whether to provide a permission of driving a driving portion based on the authentication information received by the first communicator, and a control device to drive the driving portion when the permission is provided in the authentication processing.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a view illustrating a relation between start-up information F1 and start-up information G1.

FIG. 12 is a schematic view illustrating an anti-theft system for a working machine according to a fifth embodiment of the present invention.

FIG. 13 is a view illustrating a home screen M1 and a setting screen M2 according to the fifth embodiment.

DESCRIPTION OF THE EMBODIMENTS

Figure 1:
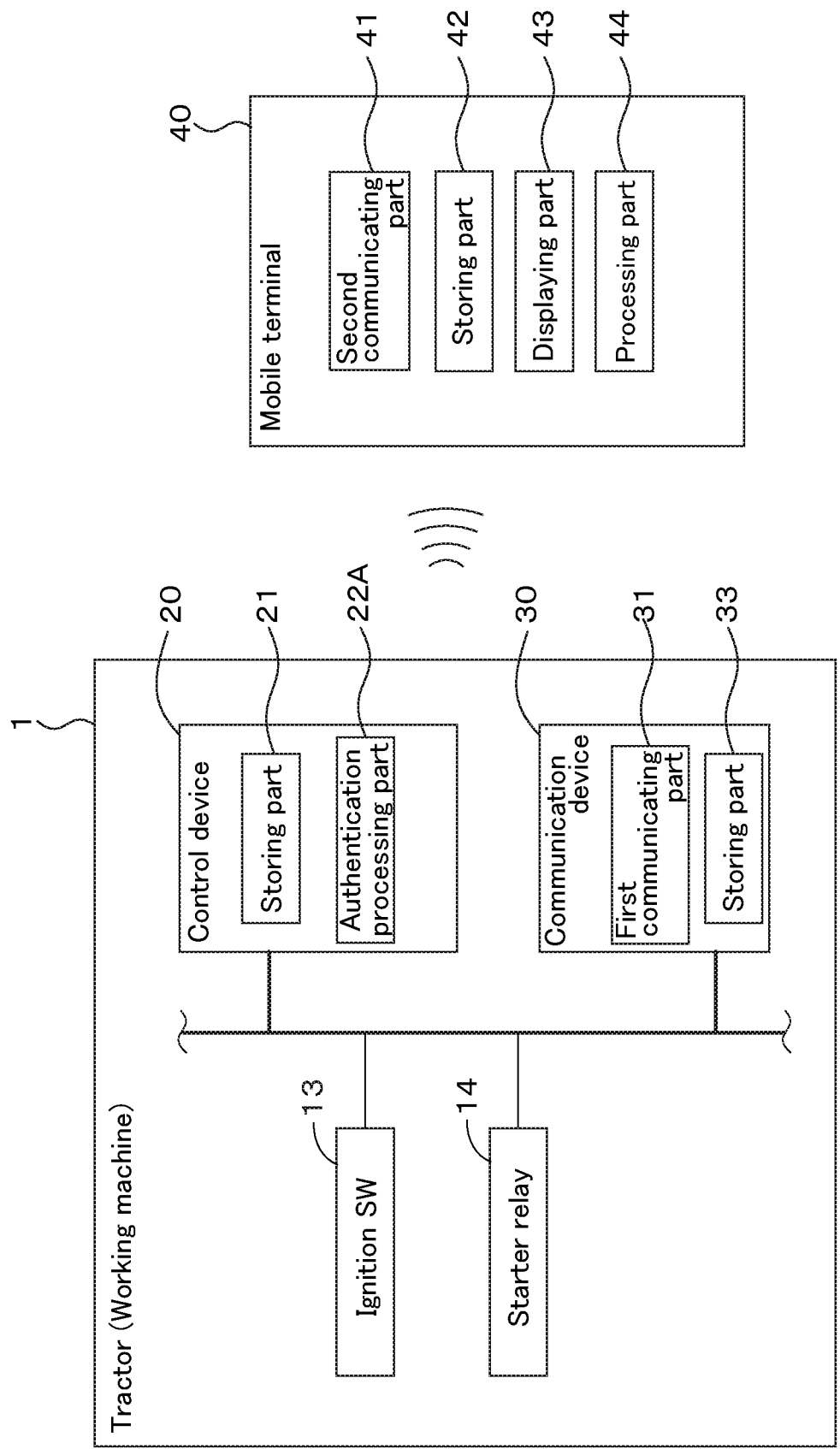
FIG. 1 is a schematic view illustrating an anti-theft system for a working machine according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

First Embodiment

FIG. 1 shows an overall view of an anti-theft system of a working machine. The working machine is a tractor, a combine, a rice transplanter, a backhoe, a skid steer loader, a compact track loader, and the like. Firstly, the working machine will be described taking the tractor 1 as an example.

Figure 15:
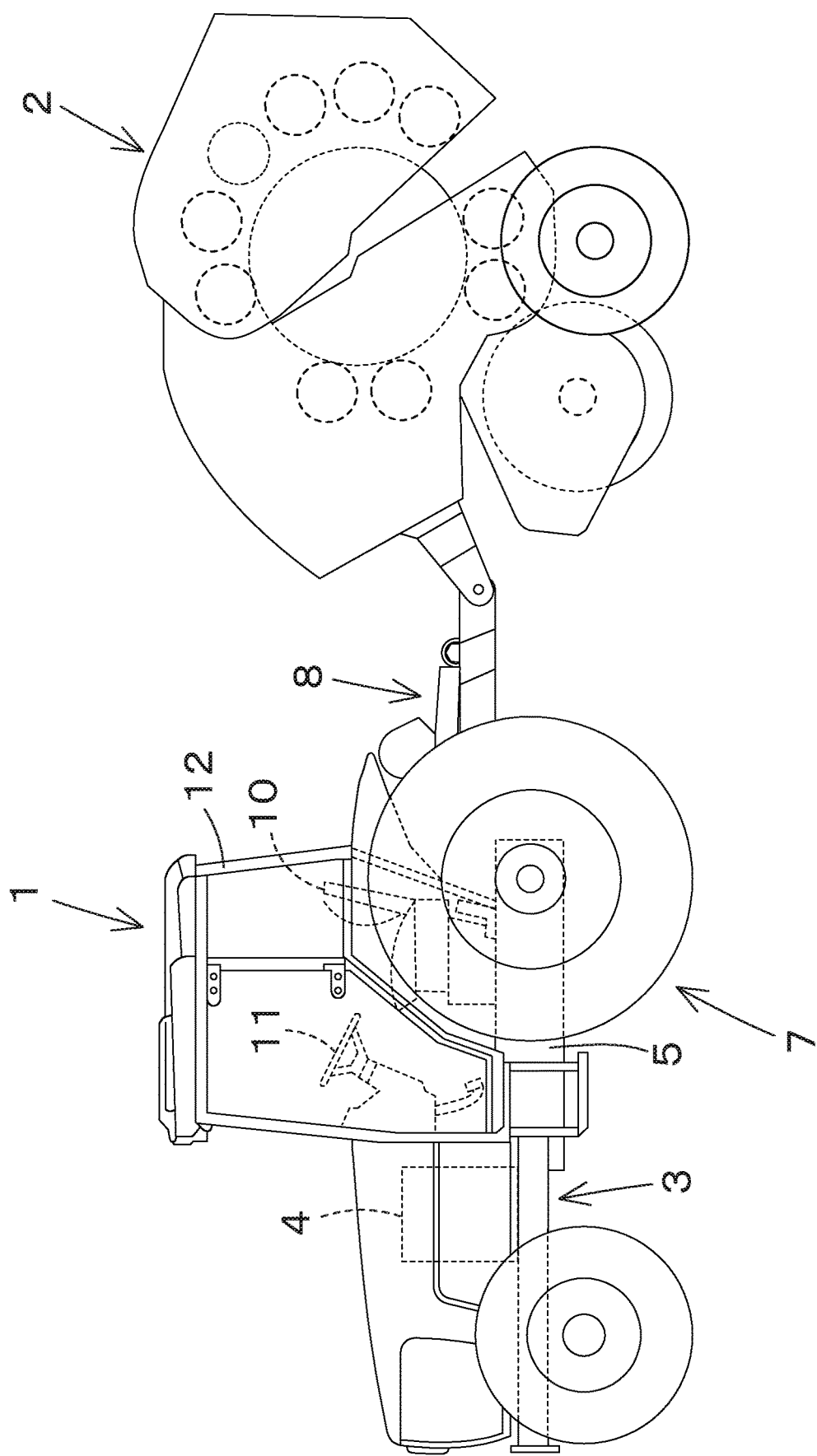
FIG. 15 is a schematic side view illustrating a tractor according the embodiments.

As shown in FIG. 15, the tractor 1 includes a vehicle (a vehicle body) 3, a prime mover 4, a speed-changing device (a transmission) 5, and a traveling device 7. The prime mover 4 is an internal combustion engine such as a gasoline engine or a diesel engine, an electric motor, or the like. In the embodiment, the prime mover 4 is a diesel engine (referred to as an engine).

Meanwhile, the prime mover 4 may be a hybrid type having an internal combustion engine and an electric motor. The speed-changing device 5 is a device configured to change a thrust force or the like of the traveling device 7, that is, a device configured to change a gear shift step. The traveling device 7 is a device having a front wheel and a rear wheel. The front wheel and the rear wheel may be a tire type or a crawler type.

In addition, a connecting portion 8 constituted of a three-point link mechanism or the like is provided at the rear portion of the vehicle body 3. The working device 2 is configured to be attached to and detached from the connecting portion 8. When the working device 2 is connected to the connecting portion 8, the working device 2 can be towed by the vehicle body 3. The working device 2 is a cultivating device for the cultivation, a fertilizer distribution device for the fertilizer distribution, an agricultural chemicals distribution device for the agricultural chemicals distribution, a harvesting device for the harvesting, a mowing machine for the grass mowing and the like, a tedding machine for the pasture tedding and the like, a raking machine for the grass raking and the like, a bailing machine for the grass bailing and the like, and the like. Meanwhile, FIG. 15 shows an example in which the baling machine is attached as a working device 2.

In addition, the tractor 1 includes an operator seat 10 disposed on the vehicle body 3 and an steering devicE11. The operator seat 10 and the steering devicE11 are arranged in a cabin 12 provided in the vehicle body 3. The steering devicE11 is constituted of, for example, an steering wheel or the like, and the traveling direction of the tractor 1 can be changed by steering the steering devicE11.

As shown in FIG. 1, the anti-theft system for the working machine is provided with a control device 20.

The control device 20 is a device provided in the tractor 1 and configured to perform the control relating to the tractor 1. The control device 20 is configured to allow a driving portion to be driven when the verification between the authentication information (external authentication information) obtained by the control device 20 from the outside and the authentication information (storage authentication information) stored in the control device 20 is established, and not to allow the driving portion to be driven when the verification is not established. The driving part is the prime mover 4, the speed-changing device 5, the traveling device 7, and the like. In the embodiment, the driving part is the prime mover 4.

Next, the control by the control device 20 relating to the driving of the prime mover 4 will be described in detail below.

To the control device 20, an ignition switch 13 and a starter relay 14 are connected through an in-vehicle network or the like. The ignition switch 13 is a switch configured to be switched between ON and OFF, and is provided in the vicinity of the operator seat 10 and configured to be operated by an operator. The starter relay 14 is a switch configured to be switched between ON and OFF. When the starter relay 14 is ON, the prime mover 4 is driven. When the starter relay 14 is OFF, the prime mover 4 is not driven.

The control device 20 has a storage part 21 and an authentication processing part 22A. The storage part 21 is constituted of a nonvolatile memory or the like, and stores the authentication information (the storage authentication information). The storage authentication information is constituted of characters, numeric numbers, and the like uniquely determined for each of the tractors 1, that is, for each of the control devices 20.

The authentication processing part 22A is constituted of electric/electronic components provided in the control device 20, programs stored in the control device 20, and the like. The authentication processing part 22A executes the authentication processing that determining whether or not to permit the driving of the prime mover 4 (the driving part).

That is, when the ignition switch 13 is switched from OFF to ON, the authentication processing in the authentication processing part 22A is started. In the authentication processing in the authentication processing part 22A, when the external authentication information and the storage authentication information are compared with each other, the authentication processing part 22A determines that authentication has been established if the external authentication information and the storage authentication information match are matched with each other, that is, if the external authentication information and the storage authentication information are in association with each other (related to each other), and the authentication processing part 22A permits the driving of the prime mover 4. When the driving of the prime mover 4 is permitted, the control device 20 performs the authentication processing to switch the starter relay 14 from OFF to ON.

On the other hand, the authentication processing part 22A determines that authentication has not been established if the external authentication information and the storage authentication information match are not matched with each other, that is, if the external authentication information and the storage authentication information are not in association with each other (not related to each other), and the authentication processing part 22A does not permit the driving of the prime mover 4, and then the starter relay 14 is held at OFF.

Meanwhile, the anti-theft system for the working machine is provided with a communication device 30 and a mobile terminal 40.

The communication device 30 is provided in the tractor 1. The communication device 30 receives data (information) from the mobile terminal 40 or the like, and sends (transmits) the data (the information) to the mobile terminal 40 or the like. For example, the communication device 30 receives the authentication information (the external authentication information) transmitted from the mobile terminal 40, and sends (transmits) a beacon requesting transmission of the external authentication information and the like to the mobile terminal 40.

In addition, the communication device 30 is connected to the control device 20 and the ignition switch 13 through an in-vehicle network or the like. The communication device 30 is configured to obtain information outputted from the control device 20 and to output the information to the control device 20.

The communication device 30 includes a first communicating part 31 and a storage part 33. The first communicating part 31 is constituted of electric/electronic components provided in the communication device 30, programs stored in the communication device 30, and the like.

The first communicating part 31 is configured to transmit a broadcast signal (the information) such as a beacon to the mobile terminal 40, and to perform a wireless communication with the mobile terminal 40 according to, for example, the Bluetooth Low Energy (a registered trademark) in the specification of the Bluetooth (a registered trademark) of the communication standard IEEE 802.15.1 series or the like. The storage part 33 temporarily stores the authentication information (the external authentication information) received by the first communicating part 31, that is, the authentication information transmitted from the mobile terminal 40.

The mobile terminal 40 is a terminal configured to be communicated with (connected to) the communication device 30, and is a portable device such as a tablet, a smartphone, a PDA, and the like which can be carried. The mobile terminal 40 is configured to transmit and receive various data (various information) to/from the communication device 30.

The mobile terminal 40 has a second communicating part 41. The second communicating part 41 is constituted of components and the like configured to perform a short-distance and a long-distance communication, and to perform a wireless communication with the communication device 30 according to, for example, the Bluetooth Low Energy (a registered trademark) in the specification of the Bluetooth (a registered trademark) of the communication standard IEEE 802.15.1 series or the like. Meanwhile, the second communicating part may be configured to perform the wireless communication in a mobile phone communication network, the data communication network, the cellular phone communication network or the like.

In addition, the mobile terminal 40 includes a storage part 42, a displaying part 43, and a processing part (a communication processing part) 44. The storage part 42 is constituted of a nonvolatile memory, and stores various kinds of application software (applications), an operation system (OS), and authentication information (external authentication information) to be transmitted to the tractor 1. The displaying part 43 is configured to display various kinds of information, and is constituted of a liquid crystal panel or the like.

As shown in FIG. 13, the displaying part 43 is configured to display a screen relating to the anti-theft, for example, a home screen M1 and a setting screen M2. A setting button 201, a communication state 202, and a machine state 203 are displayed on the home screen M1. When the setting button 201 displayed on the home screen M1 is selected, the displaying part 43 displays the setting screen M2.

On the setting screen M2, it is possible to select the working machine (the tractor) 1 configured to output the external authentication information from the mobile terminal 40 to the communication device 30. A working machine list 302 and a determination button 305 are displayed on the setting screen M2. In the working machine list 302, the names of the working machine 1 corresponding to the authentication information (the external authentication information) stored in the storage part 42 is displayed.

A check box 303 is displayed on the left side of the name of the working machine 1 in the working machine list 302. On the right side of the name of the working machine 1 in the working machine list 302, it is displayed whether output of the external authentication information from the mobile terminal 40 to the working machine 1 is valid or invalid.

The operator selects the name of the working machine 1 whose output of the external authentication information from the mobile terminal 40 is requested to be validated. When the name of the working machine 1 is selected, the mark 304 is displayed in the check box 303 of the working machine 1 selected above. The operator selects the decision button 305 when the selection of the working machine 1 is completed. When the determination button 305 is selected, the displaying part 43 displays the home screen M1.

In the communication state 202, information on the working machine 1 (the communication device 30) that transmitted a beacon B, for example, a machine number, a machine name, and the like are displayed when the mobile terminal 40 receives the beacon B.

In the machine state 203, the state of the working devicE1 having the communication device 30 mounted thereon is displayed when the communication between the mobile terminal 40 and the communication device 30 is established. For example, "lock released" is displayed when the prime mover 4 of the working machine 1 is driven, and "locked" is displayed when the prime mover 4 of the working machine 1 is not driven.

In the mobile terminal 40, the operator can arbitrarily select the working machine 1 whose output of the external authentication information is requested to be validated. Thus, for example, in the case where there are a plurality of working machines 1, it is possible to freely select one of the working machines 1 that the operator need to operate from among the plurality of working machines 1.

In addition, even when a plurality of operators each have the mobile terminal 40, each operator can arbitrarily select the working machine 1, and thus a plurality of operators can operate a plurality of working machines.

Next, the connecting between the mobile terminal 40 and the communication device 30 will be described below.

Figure 2:
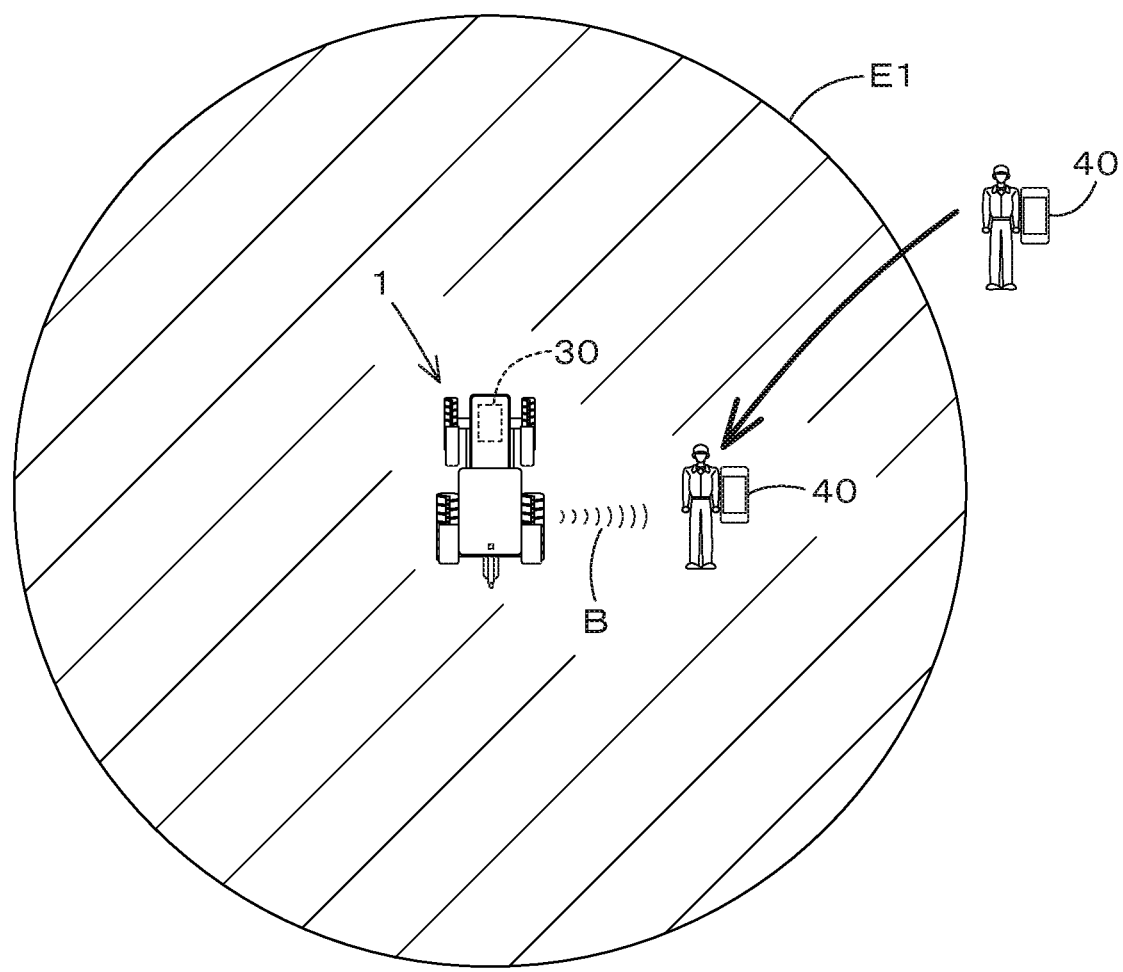
FIG. 2 is an explanation view explaining connection between a mobile terminal and a communication device according to the first embodiment.

As shown in FIG. 2, the first communicating part 31 of the communication device 30 outputs the beacon B. In the case where the mobile terminal 40 (the second communicating part 41) is located outside the communication area E1 (the area where the beacon B can be transmitted) by the beacon B, the processing part 44 does not perform the processing relating to the anti-theft, for example, does not perform the output processing to output the external authentication information.

The output processing is performed by reading out from the storage part 42 and activating the application software (referred to as an anti-theft application) for transmitting the external authentication information stored in the storage part 42 of the mobile terminal 40 to the tractor 1. The processing part 44 does not execute the activation of the anti-theft application in a case where the mobile terminal 40 is outside the communication area E1.

When the processing part 44 activates the anti-theft application, the home screen M1 is displayed on the displaying part 43. On the other hand, when the anti-theft application is not activated, the home screen M1 is not displayed on the displaying part 43.

Meanwhile, the anti-theft application is an application software for sending the external authentication information to the communication device 30 or for displaying a screen relating to the theft prevention. And, the mobile terminal 40 stores a program for performing the output processing by being installed to the mobile terminal 40, the information (a service UUID, a PIN code, and the like) necessary for connecting the mobile terminal 40 and the communication device 30 to each other, activation information G1 described below, and the like.

In the case where the mobile terminal 40 is within the communication area E1, the processing part 44 executes the starting of the output processing and activates the anti-theft application at the time when the second communicating part 41 of the mobile terminal 40 receives the beacon B. The processing part 44 executes the connection processing after the activation of the anti-theft application (after the starting of the output processing). In the connection processing, at least the processing part 44 instructs the second communicating part 41 to connect with the communication device 30.

The second communicating part 41 transmits a connection request to the communication device 30 in response to a command from the processing part 44, and the communication between the communication device 30 and the second communicating part 41 is performed. When the communication is established between the communication device 30 and the second communicating part 41, the processing part 44 causes an operation (a processing) of the anti-theft application or the like to transmit the external authentication information toward the communication device 30.

Upon receiving the information transmitted from the tractor 1 side, the processing part 44 terminates the connection processing at the time of receiving the authentication result or the information in which the driving of the prime mover 4 has been completed, for example, and then the processing part 44 disconnects the communication between the second communicating part 41 and the communication device 30. After disconnection of the communication with the second communicating part 41, the communication device 30 outputs the beacon B again.

Figure 3:
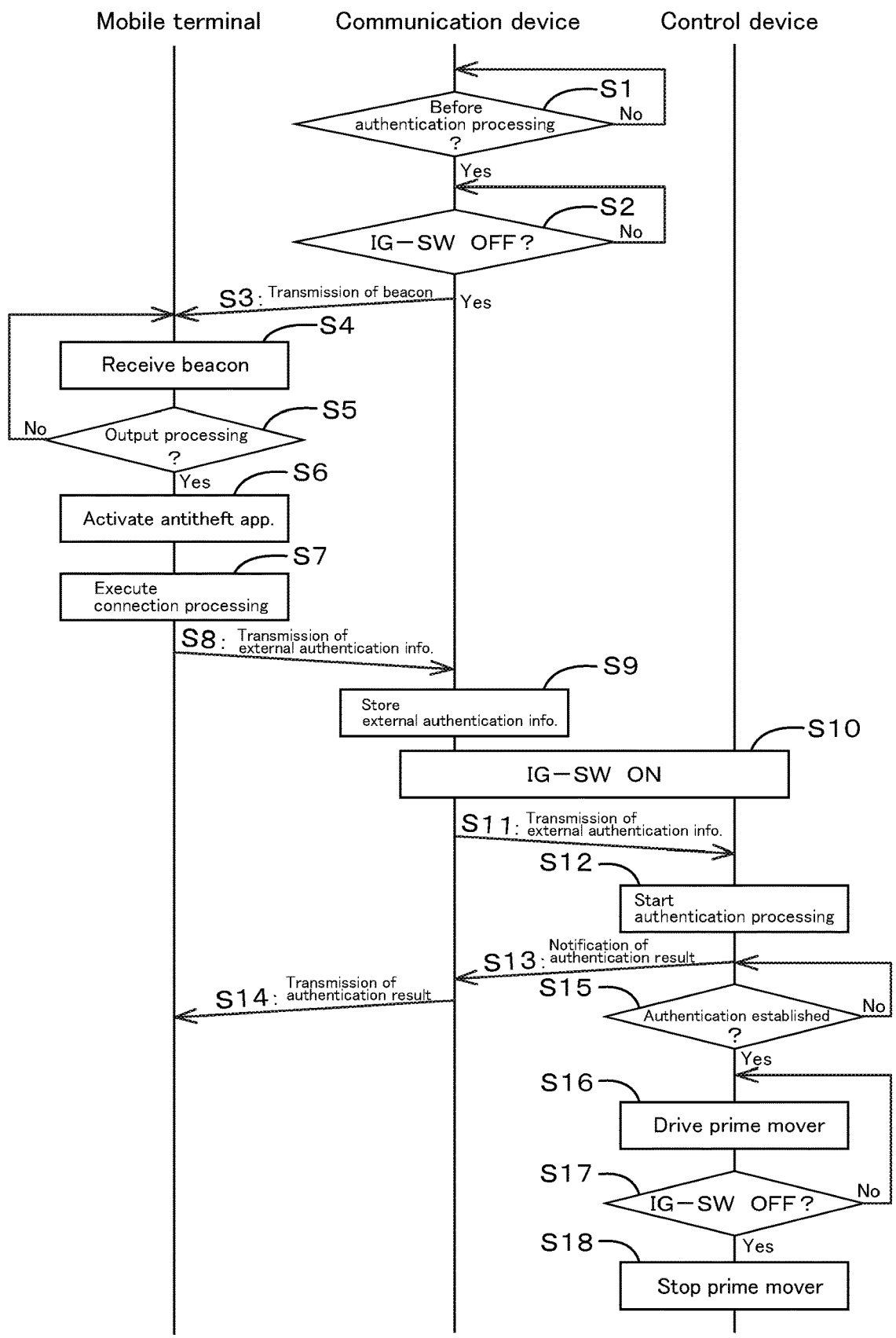
FIG. 3 is a view illustrating a flowchart of connecting the mobile terminal to the communication device according to the first embodiment.

FIG. 3 shows a flowchart of the connection between the mobile terminal 40 and the communication device 30, that is, an anti-theft method for the working machine. The connection between the mobile terminal 40 and the communication device 30 will be described in detail with reference to FIG. 3.

As shown in FIG. 3, the communication device 30 judges whether it is before the execution of the authentication processing of the authentication processing part 22A, that is, whether the authentication processing is not performed (S1).

In addition, the communication device 30 judges whether or not the ignition switch (IG-SW) 13 is in the OFF state (S2).

In the case where it is before the execution of the authentication processing of the authentication processing part 22A (S1, Yes) and in the case where the IG-SW 13 is in the OFF state (S2, Yes), the first communicating part 31 transmits the beacon B to the mobile terminal 40 (S3), the beacon B requesting transmission of the authentication information.

When the second communicating part 41 of the mobile terminal 40 receives the beacon B (S4), the processing part 44 judges whether or not to execute the output processing on the basis of the information included in the beacon B (S5).

Figure 4:
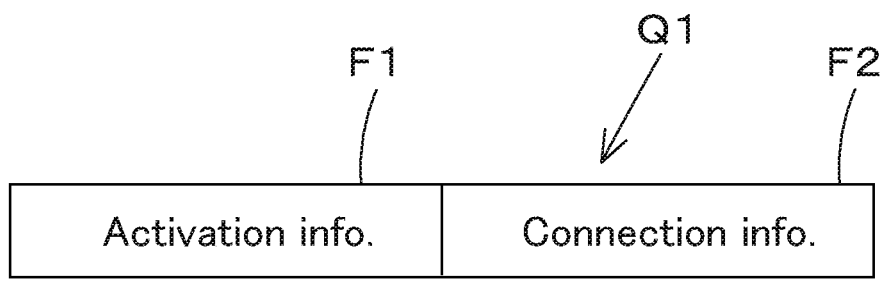
FIG. 4 is a view illustrating one example of a packet of a beacon according to the first embodiment.

FIG. 4 shows a packet (an advertisement packet) Q1 of the beacon B. As shown in FIG. 4, the packet Q1 includes the activation information F1 and the connection information F2. The activation information F1 is information used for triggering the start of the output processing. In the case when the activation information G1 same as the activation information F1 included in the beacon B (the packet Q1) transmitted by the communication device 30 is stored in the storage part 42 of the mobile terminal 40, the processing part 44 determines to execute the output processing (S5, Yes).

On the other hand, in the case where the activation information G1 same as the activation information F1 included in the beacon B (the packet Q1) transmitted by the communication device 30 is not stored in the storage part 42 of the mobile terminal 40, the processing part 44 determines not to execute the output processing (S5, No).

FIG. 5 shows the relation between the activation information F1 of the beacon B transmitted by the communication device 30 and the activation information G1 stored in the storage part 42 of the mobile terminal 40. As shown in FIG. 5, when the activation information F1 transmitted by the communication device 30 is a numeral "5411" and the activation information G1 stored in the storage part 42 of the mobile terminal 40 is a numeral "5411", both of the activation information are matched with each other. Thus, the processing part 44 determines to execute the output processing.

On the other hand, in the case where the activation information F1 transmitted by the communication device 30 is a numeral "5400" and the numeral "5400" is not stored in the activation information G1 stored in the storage part 42 of the mobile terminal 40, both of the activation information are not matched with each other. Thus, the processing part 44 determines not to execute the output processing.

In the embodiment described above, the output processing is executed in the case where the activation information G1 same as the activation information F1 of the beacon B is stored in the mobile terminal 40. However, instead of that, in the case where the activation information G1 associated with the activation information F1 of the beacon B is stored in the mobile terminal 40, the processing part 44 may execute the output processing.

When the processing part 44 determines to execute the output process (S5, Yes), the processor 44 executes the start of the output process and activates the anti-theft application (S6).

When the activation of the anti-theft application is completed, the processing part 44 executes the connection processing (S7).

For example, after the execution of the connection processing, the processing part 44 performs the connection processing to the communication device 30 with use of the connection information F2 received. The connection information F2 is information to connect with the communication device 30, and is, for example, a service UUID, a PIN code, and the like, and the second communicating part 41 transmits the service UUID or the PIN code to the communication device 30, and thereby the connection between the mobile terminal 40 and the communication device 30 is established.

Meanwhile, the processing related to the connection between the mobile terminal 40 and the communication device 30 is the same as the conventional processing, and thus performs the authentication of the service UUID or the PIN code.

After connecting to the communication device 30 (after receiving the beacon), the mobile terminal 40 (the second communicating part 41) transmits, to the communication device 30, the authentication information (the external authentication information) stored in the storage part 42 (S8).

That is, the second communicating part 41 transmits the external authentication information to the communication device 30 after receiving the beacon and before the authentication information (the external authentication information) from the control device is requested.

Upon reception of the external authentication information, the communication device 30 stores, in the storage part 33, the external authentication information received (S9).

Here, when the IG-SW 13 is switched from OFF to ON (S10), it is inputted to the communication device 30 that the IG-SW 13 is turned ON, and the communication device 30 transmits the external authentication information to the control device 20, the external authentication information being temporarily stored in the storage part 33 (S11).

In addition, when the IG-SW 13 is turned ON, the authentication processing by the authentication processing part 22A of the control device 20 is started (S12).

That is, after the communication device 30 receives the external authentication information, the authentication processing part 22A of the control device 20 executes the authentication processing on the basis of the external authentication information received. That is, in the case where the IG-SW 13 is turned ON, the communication device 30 outputs the external authentication information to the control device 20 before the authentication processing by the control device 20 is executed.

After the start of the authentication processing, the control device 20 (the authentication processing part 22A) notifies the communication device 30 of the authentication result, that is, notifies the communication device 30 whether the authentication information is established or not (S13).

The communication device 30 transmits the authentication result to the mobile terminal 40 (S14), and thereafter the mobile terminal 40 (the processing part 44) terminates the connection processing after receiving the authentication result.

On the other hand, when authentication of the authentication information is established by the authentication processing of the authentication processing part 22A on the side of the tractor 1 (S15, Yes), the authentication processing part 22A drives the prime mover 4 (S16).

After driving the prime mover 4, the control device 20 stops the driving of the prime mover 4 (S18) when the IG-SW 13 is turned from ON to OFF (S17, Yes).

Meanwhile, note that the communication device 30 may transmit the switch information of the IG-SW 13 to the mobile terminal 40 after establishment of the authentication information.

The mobile terminal 40 indicates that the switch information transmitted from the communication device 30 has switched from ON to OFF of the IG-SW 13, and counts the timer from the time when the switching has been made, and then the connection processing may be terminated after a predetermined time has passed from the start of counting the timer.

That is, the mobile terminal 40 terminates the connection processing after the authentication has been established and after a predetermined time or more has passed from the turning off of the IG-SW 13.

On the other hand, even if the IG-SW 13 is switched from ON to OFF after the establishment of the authentication information, the control device 20 may continue the driving of the prime mover 4 in the case where the connection of the mobile terminal 40 is confirmed by the communication device 30, that is, in the case where the connection processing is not terminated. Also in that case, after a predetermined time has passed from the timing at which the IG-SW 13 is turned from ON to OFF, the control device 20 stops the driving of the prime mover 4 regardless of whether or not the connection of the mobile terminal 40 is confirmed.

The anti-theft system for the working machine includes the communication device 30 having the first communicating part 31, the mobile terminal 40 having a second communicating part 41 configured to transmit the authentication information to the communication device 30 after receiving the beacon, and an authentication processing part 22A configured to execute an the authentication processing to provide the permission to the driving portion of the working machine.

In addition, the first communicating part 31 transmits the beacon to the mobile terminal 40 before the authentication processing of the authentication processing part 22A is executed, and the second communicating part 41 transmits the authentication information to the communication device 30 after receiving the beacon. Then, after the communication device 30 receives the authentication information, the authentication processing part 22A executes authentication processing on the basis of the authentication information received.

According to that configuration, the mobile terminal 40 can transmit the authentication information to the communication device 30 only by entering of the mobile terminal 40 into the communication area of the beacon when the mobile terminal 40 receives the beacon transmitted from the communication device 30.

That is, since the mobile terminal 40 can transmit the authentication information to the communication device 30 only by receiving the beacon transmitted before the execution of the authentication processing of the authentication processing part 22A, the authentication processing part 22A can already receive the authentication information without executing the communication processing after the execution of the authentication processing.

In other words, the control device to perform the authentication firstly requests the outside such as the mobile terminal 40 for the authentication information at the first step of the authentication processing in the conventional authentication processing. However, in the embodiment, the mobile terminal 40 transmits the external authentication information to the communication device 30 before the control device requests the mobile terminal 40 for the authentication information.

That is, it is possible to quickly perform the processing relating to the transmission and the authentication of the authentication information, and thus to drive the driving part quickly.

In addition, the mobile terminal 40 automatically transmits the authentication information to the working machine 1 only when the operator having the mobile terminal 40 in a pocket or the like approaches the working machine 1, and on the side of the working machine 1, the authentication processing can be automatically executed by the authentication processing part 22A.

In addition, the first communicating part 31 transmits the beacon to the mobile terminal 40 in the case where the ignition switch 13 is in the OFF state before the authentication processing part 22A executes the authentication processing, and the authentication processing part 22A executes the authentication processing in the case where the ignition switch 13 is in the ON state.

In this manner, since the first communicating part 31 already transmits the beacon to the mobile terminal 40 at the stage where the ignition switch 13 is in the OFF state, the working machine 1 (the communication device 30) can receive the authentication information of the mobile terminal 40 before the ignition switch 13 is turned ON, and thus the working machine 1 (the communication device 30) can execute the authentication processing immediately when the ignition switch 13 is turned ON.

Meanwhile, the communication device 30 is configured to transmit a plurality of the beacons. For example, the communication device 30 is configured to transmit separately, at different timings, the first beacon (the first beacon) B1 and the second beacon (the second beacon) B2 including the second activation information. The first beacon B1 and the second beacon B2 are different beacons respectively including different information, and the first beacon B1 includes the first activation information and the second beacon B2 includes the second activation information.

Figure 6:
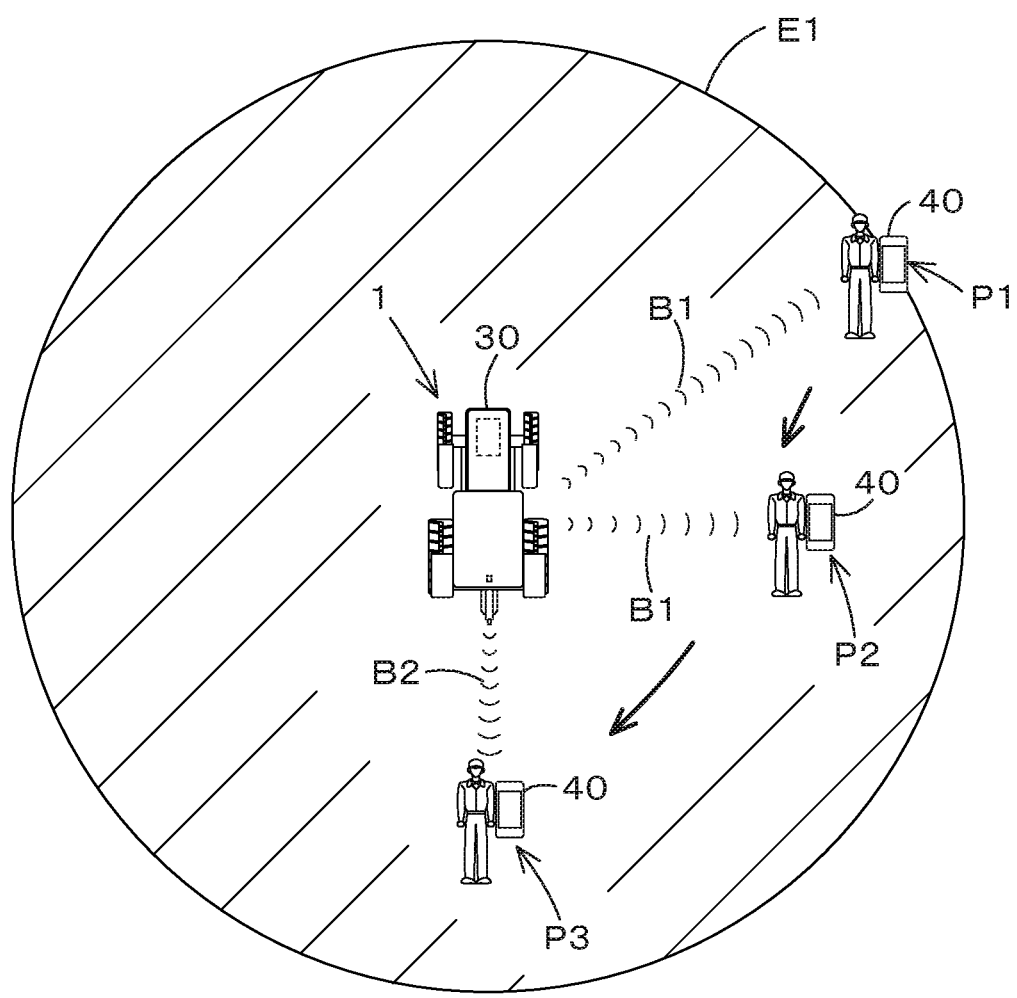
FIG. 6 is a view illustrating a state where the communication device sends a first beacon B1 and a second beacon B2.

FIG. 6 shows a state in which the communication device 30 transmits the first beacon B1 and the second beacon B2 to a predetermined one of the mobile terminals 40. For example, the connection between the communication device 30 and the mobile terminal 40 will be described on the assumption that the first activation information is a numeral "5411" and the second activation information is a numeral "5412".

As shown in FIG. 6, in the case where the mobile terminal 40 receives the first beacon B1 including the first activation information at the position P1 that is a boundary of the communication area E1, the activation information same as the first activation information is stored as shown in FIG. 5, and thus the processing part 44 of the mobile terminal 40 executes the output processing and the connection processing.

Then, in the case where the mobile terminal 40 receives the first beacon B1 at the position P2 in the communication area E1, the first beacon B1 being same as the beacon received at the position P1, that is, in the case where the mobile terminal 40 receives the first beacon B1 at the position P2 different from the position P1, the first beacon B1 including the activation information same as the activation information serving as a trigger for starting the output processing at the position P1, the processing part 44 does not execute the output processing.

In addition, in the case where the mobile terminal 40 receives the second beacon B2 different from the first beacon B1 at the position P3 in the communication area E1, the processing part 44, upon reception of the second beacon B2, activates the anti-theft application by the processing same as the processing executed based on the first beacon B1, that is, by the starting of the output processing. Then, the mobile terminal 40 executes the authentication processing (the driving of the prime mover 4) by executing the connection processing after the starting of the output processing.

That is, in the case where the output processing is executed in the communication area E1 upon reception of the first beacon B1 as a trigger, the mobile terminal 40 does not execute the output processing even when receiving the identical first beacon B1 again after that. And then, the mobile terminal 40 executes the output processing when receiving the second beacon B2 different from the first beacon B1.

Meanwhile, in the case where the output process is executed upon reception of the second beacon B2 as a trigger, the mobile terminal 40 does not execute the output processing even when receiving the identical second beacon B2 again after that. And then, the mobile terminal 40 executes the output processing when receiving a beacon different from the beacon B1 and the second beacon B2.

That is, in the case where the mobile terminal 40 receives a beacon having the identical activation information in a plurality of times under the state where the mobile terminal 40 is located within the communication area E1, the mobile terminal 40 does not execute the output processing on the basis of the second beacon and the following beacons.

Therefore, the communication device 30 (the first communicating part 31) is configured to transmit a plurality of beacons, and in the case where the processing part 44 receives the first beacon B1, of the plurality of beacons, having the information same as the beacon serving as the trigger for executing the processing, the processing part 44 does not execute the processing, and in the case where the processing part 44 receives the second beacon B2 different from the first beacon B1, the processing part 44 executes the processing same as the processing executed based on the first beacon.

That is, in the case where the processing part 44 obtains the first beacon B1, of the plurality of beacons, including the activation information same as the activation information serving as the trigger for starting the processing, the processing part 44 does not execute the processing, and in the case where the processing part 44 receives the second beacon B2 having the activation information different from the activation information of the first beacon B1, the processing part 44 executes the output processing.

For example, under a state where the mobile terminal 40 is located in the communication area E1, the authentication processing is executed upon reception of the first beacon B1 as a trigger, the prime mover 4 is stopped in the communication area E1 after the driving of the prime mover 4. After that, in the case where the operator desires to resume the driving of the prime mover 4 after a predetermined time has passed, the authentication processing is executed again upon reception of the second beacon B2 as a trigger, and then the prime mover 4 can be driven.

Second Embodiment

Figure 7:
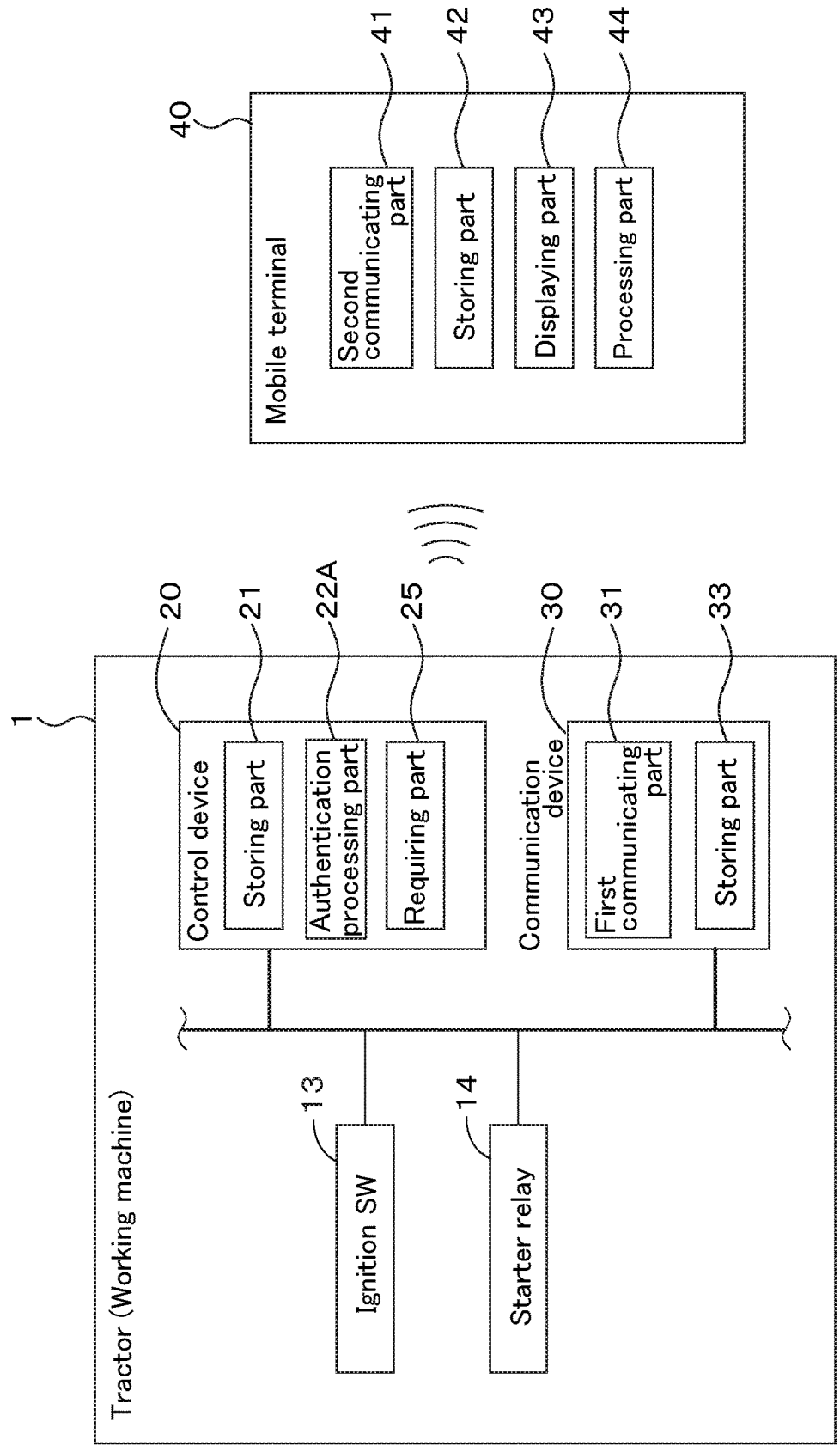
FIG. 7 is a schematic view illustrating an anti-theft system for a working machine according to a second embodiment of the present invention.

FIG. 7 shows the anti-theft system for the working machine 1 according to a second embodiment of the present invention. In the second embodiment, a configuration different from the first embodiment will be described. In the second embodiment, the authentication processing part 22A executes the authentication processing when the permission is provided by the mobile terminal 40 after the communication device 30 receives the external authentication information.

As shown in FIG. 7, the control device 20 has an requiring part 25. The requiring part 25 is constituted of electric/electronic components provided in the control device 20, programs stored in the control device 20, and the like.

When the control device 20 obtains the external authentication information output from the communication device 30, the requiring part 25 transmits a signal (a requiring signal, also referred to as an inquiring signal) to the communication device 30, the signal indicating an inquiry as to whether the authentication processing may be executed by the authentication processing part 22A. The communication device 30 transmits the requiring signal to the mobile terminal 40 after obtaining the requiring signal.

Figure 14:
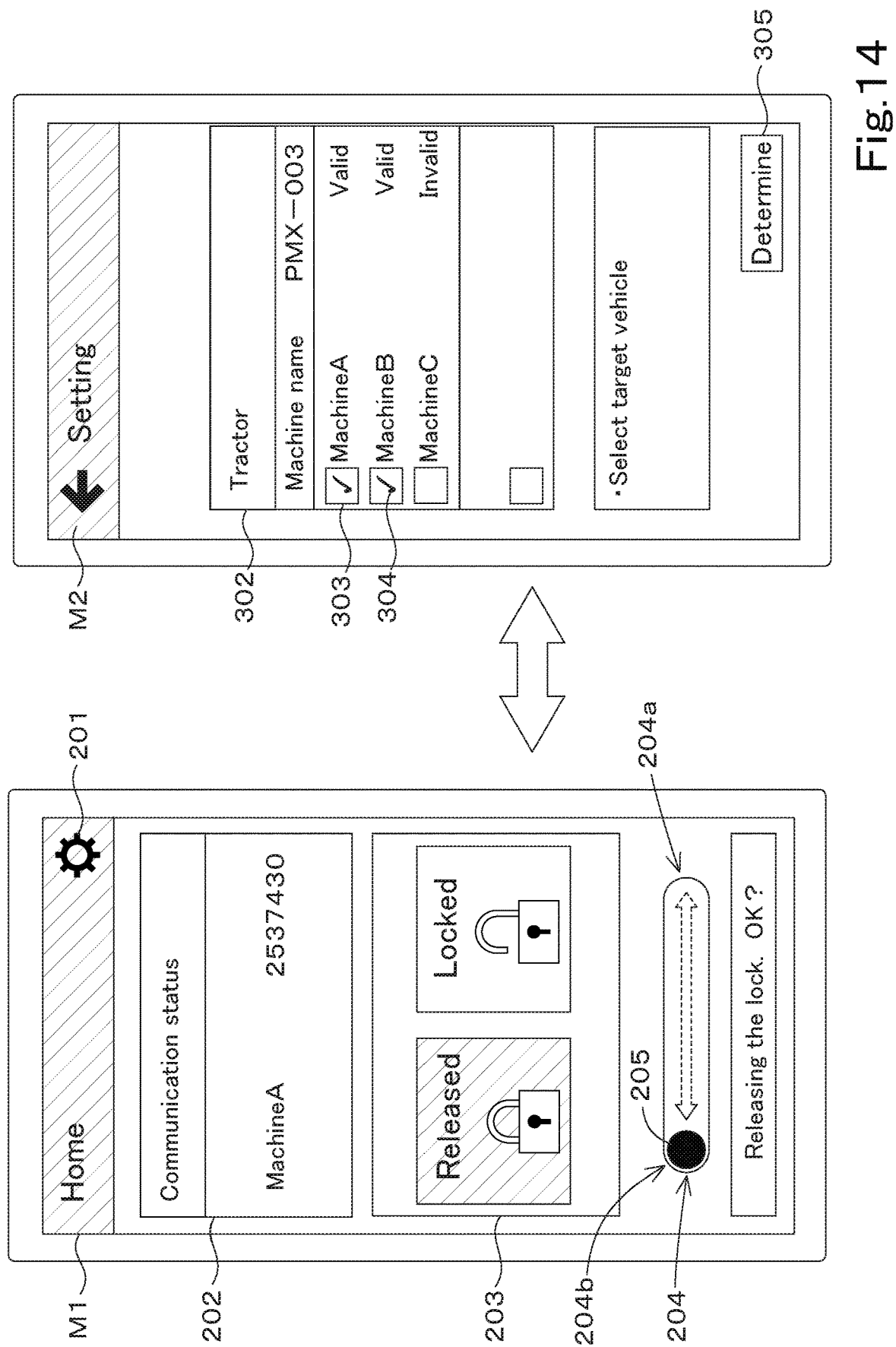
FIG. 14 is a view illustrating another home screen M1 and another setting screen M2 according to the fifth embodiment.

As shown in FIG. 14, the displaying part 43 of the mobile terminal 40 displays, on the home screen M1, that an inquiry has come from the working machine 1 as to whether the unlocking, that is, the authentication processing is permitted to be executed. In addition, the displaying part 43 displays, on the home screen M1, a setting part 204 configured to set whether a permission is given to the inquiry. The setting part 204 is a switchable slide switch or the like displayed by the displaying part 43, and thus an operator can switch the switch by touching the displaying part 43.

In the setting part (the switch) 204, when a FIG. 205 indicating the switch is slid toward one side 204a, the permission (the unlocking) is set, and when the FIG. 20 is slid toward the other side 204b, the non-permission (the locking) is set. The authentication processing part 22A executes the authentication processing in the case where the permission is set in the setting part 204.

Figure 8:
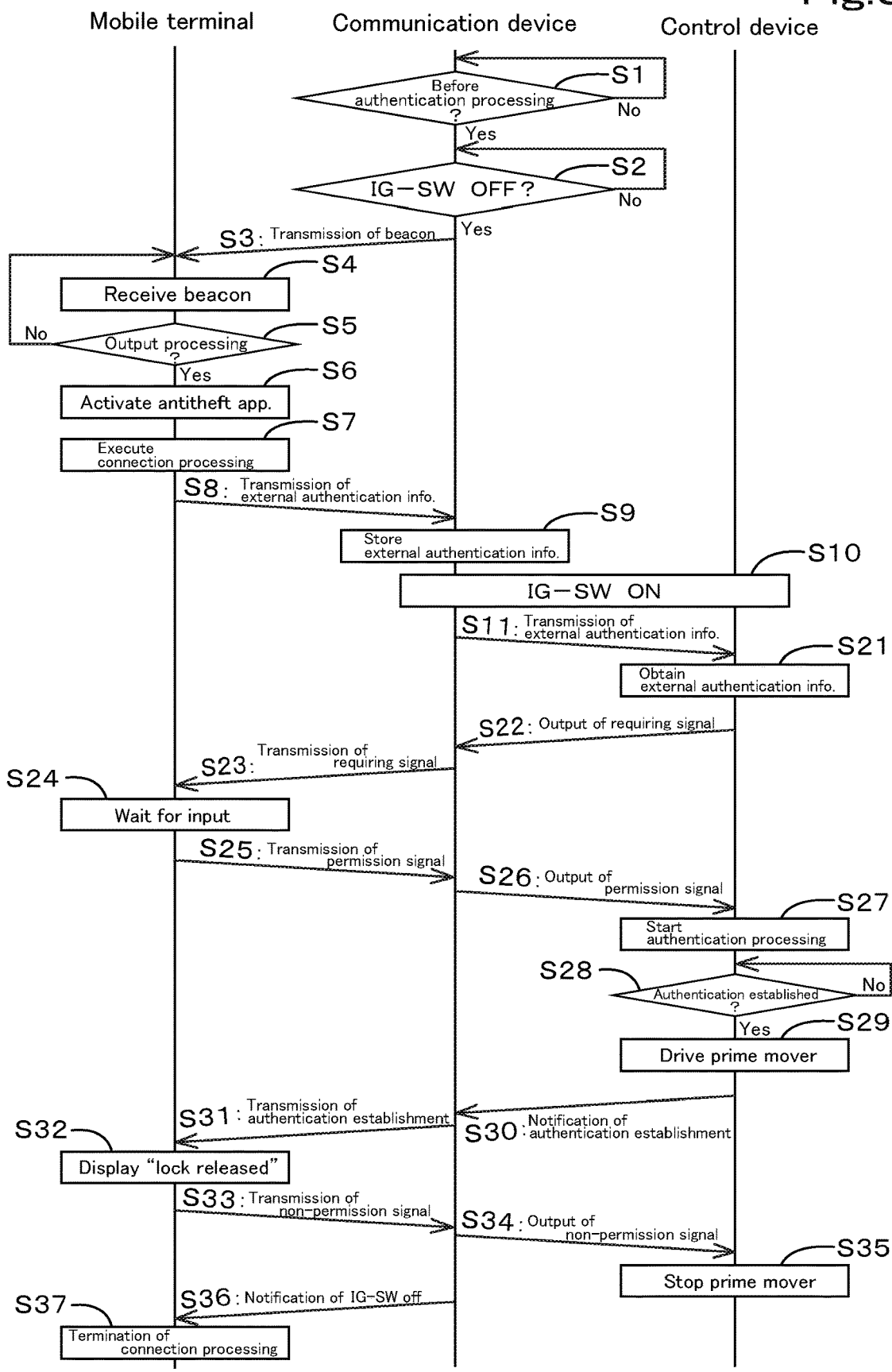
FIG. 8 is an explanation view explaining connection between a mobile terminal and a communication device according to the second embodiment.

FIG. 8 shows a flowchart of the connection between the mobile terminal 40 and the communication device 30 according to the second embodiment. In FIG. 8, a step S1 to a step S11 are the same as those in FIG. 3.

As shown in FIG. 8, when the control device 20 obtains the external authentication information (S21), the requiring part 25A outputs an requiring signal to the communication device 30 (S22).

The communication device 30 transmits the requiring signal to the mobile terminal 40 (S23).

When the mobile terminal 40 receives the requiring signal, the displaying part 43 displays that the inquiry has come and waits for the inputting to the setting part 204 (S24).

Meanwhile, the default of the setting part 204 is set to the non-permission in the waiting for the inputting to the setting part 204.

When the setting part 204 of the display section 43 switches the non-permission to the permission, the mobile terminal 40 transmits a permission signal indicating the permission to the communication device 30 (S25).

After receiving the permission signal, the communication device 30 outputs a permission signal to the control device 20 (S26).

When the control device 20 obtains the permission signal, the authentication processing portion 22A of the control device 20 starts the authentication processing (S27).

When authentication of the authentication information is established (S28, Yes), the control device 20 (the authentication processing part 22A) drives the prime mover 4 (S29).

In addition, the control device 20 notifies the communication device 30 that the authentication has been established (S30).

The communication device 30 transmits, to the mobile terminal 40, a signal indicating that the authentication has been established (S31).

The displaying part 43 of the mobile terminal 40 displays the "unlock" as the machine status 203 (S32).

When the non-permission is set from the permission in the setting part 204 of the display section 43, the mobile terminal 40 transmits, to the communication device 30, a non-permission signal indicating the non-permission (S33).

After receiving the non-permission signal, the communication device 30 outputs the non-permission signal to the control device 20 (S34).

When the control device 20 obtains the non-permission signal and the IG-SW 13 is switched from ON to OFF, the control device 20 stops the driving of the prime mover 4 (S35).

The communication device 30 notifies the mobile terminal 40 that the IG-SW 13 is turned OFF (S36).

After receiving a signal indicating that the IG-SW 13 is turned OFF, the mobile terminal 40 terminates the connection processing further after a predetermined time or more has passed (S37).

The authentication processing part 22A executes authentication processing when the permission is provided by the mobile terminal 40 after the communication device 30 receives the authentication information.

Thus, in the case where the operator or the like possesses the mobile terminal 40 or in other case, the prime mover 4 can be driven after the mobile terminal 40 confirms the operator as to whether the authentication processing can be executed (whether the prime mover 4 can be driven). The timing of driving the prime mover 4 can be set by the operator.

In addition, the control device 20 has the requiring part 25, and the mobile terminal 40 has the displaying part 43 configured to display the setting part 204 for setting whether or not the permission is given to the inquiry, and the requiring part 25 transmits an requiring signal to the communication device 30 in the case where the control device 20 obtains the authentication information, and the authentication processing part 22A executes the authentication processing when the permission is set in the setting part 204.

At the timing when the control device 20 receives the authentication information (the external authentication information) of the mobile terminal 40, the control device 20 can make an inquiry to the mobile terminal 40. In addition, it is possible to easily set whether or not the permission is made in accordance with the operation of the setting part 204 by an operator having the mobile terminal 40.

Third Embodiment

Figure 9:
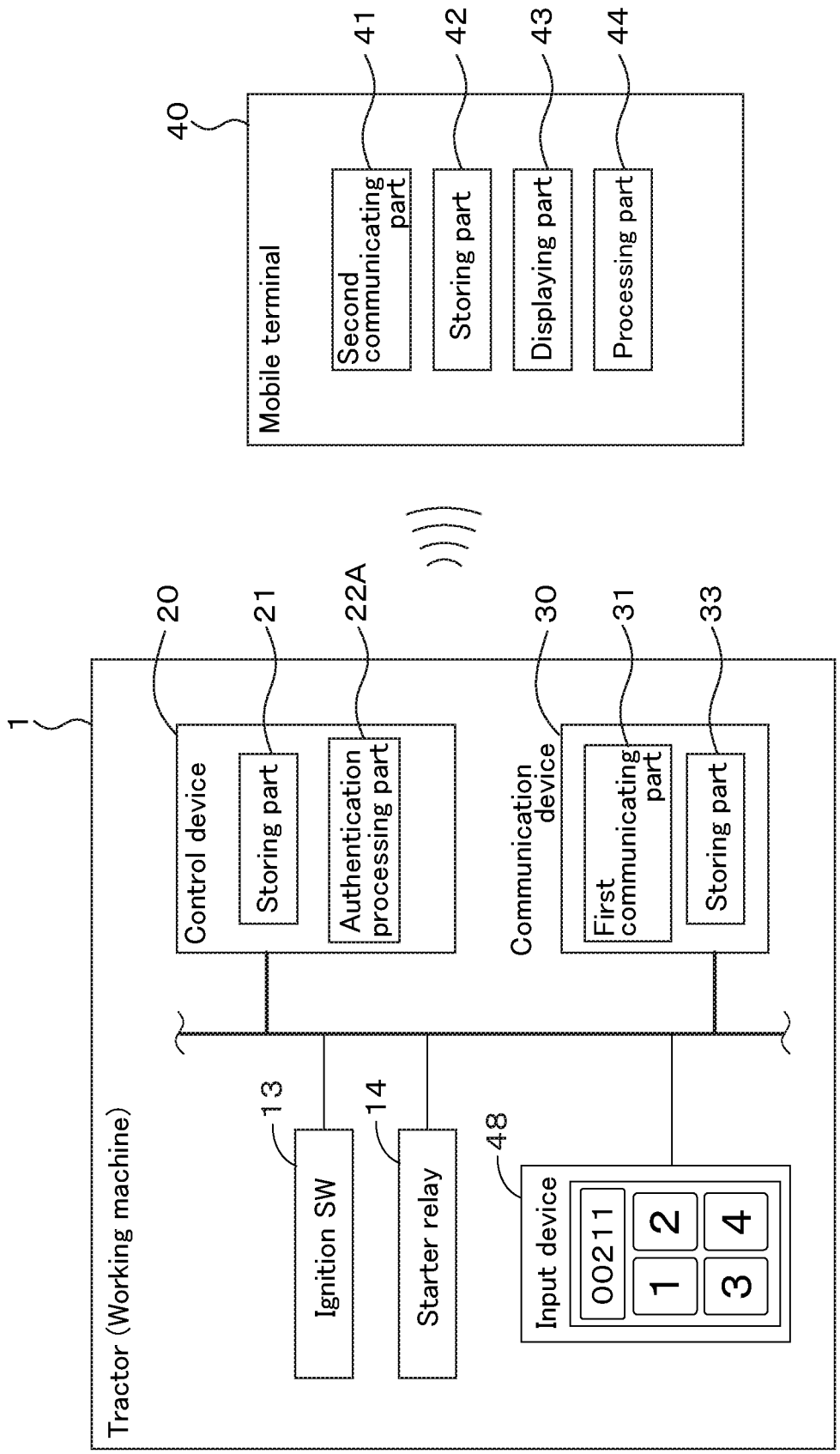
FIG. 9 is a schematic view illustrating an anti-theft system for a working machine according to a third embodiment of the present invention.

FIG. 9 shows an anti-theft system for the working machine 1 according to a third embodiment of the present invention. In the third embodiment, configurations different from those of the first embodiment and the second embodiment will be explained. A part or the whole of the configuration shown in the third embodiment can be applied to the first embodiment or the second embodiment.

As shown in FIG. 9, the tractor 1 is provided with an input device 48. The input device 48 is disposed in the vicinity of the operator seat 10, and configured to be operated by the operator. The input device 48 is a device having a plurality of keys used for inputting numeric numbers, and is configured to input, for example, the authentication information (the external authentication information) composed of a plurality of numeric numbers.

The external authentication information inputted to the input device 48 can be outputted to the control device 20. That is, in the third embodiment, the external authentication information can be inputted not only to the mobile terminal 40 but also to the input device 48.

When the IG-SW 13 is turned (switched) from OFF to ON, the input device 48 starts to accept the inputted information, and transmits the inputted information to the control device 20 as external authentication information, the inputted information being inputted to the input device 48.

For example, the authentication processing part 22A of the control device 20 executes the authentication processing with use of the external authentication information outputted from the input device 48 in the case where the external authentication information of the mobile terminal 40 is not transmitted to the control device 20 or to the communication device 30, that is, in the case where the authentication or the like is not executed by the authentication processing part 22A under the state where the communication between the mobile terminal 40 and the communication device 30 is not established. The authentication processing and other processing after the authentication processing are the same as those of the embodiments mentioned above.

Thus, an operator can start the prime mover 4 with use of the input device 48 even if the operator forgets possession of the mobile terminal 40 and even if the external authentication information can not be transmitted from the mobile terminal 40 to the tractor 1 (the communication device 30) because the battery of the mobile terminal 40 is powered off, for example.

It is preferable that the external authentication information transmitted by the input device 48 and the external authentication information transmitted by the mobile terminal 40 are different from each other. In that case, when receiving the external authentication information from the input device 48, the authentication processing part 22A performs the authentication with use of the storage authentication information corresponding to the external authentication information of the input device 48, and when receiving the external authentication information from the mobile terminal 40, the authentication processing part 22A performs the authentication with use of the storage authentication information corresponding to the external authentication information of the mobile terminal 40.

Fourth Embodiment

Figure 10:
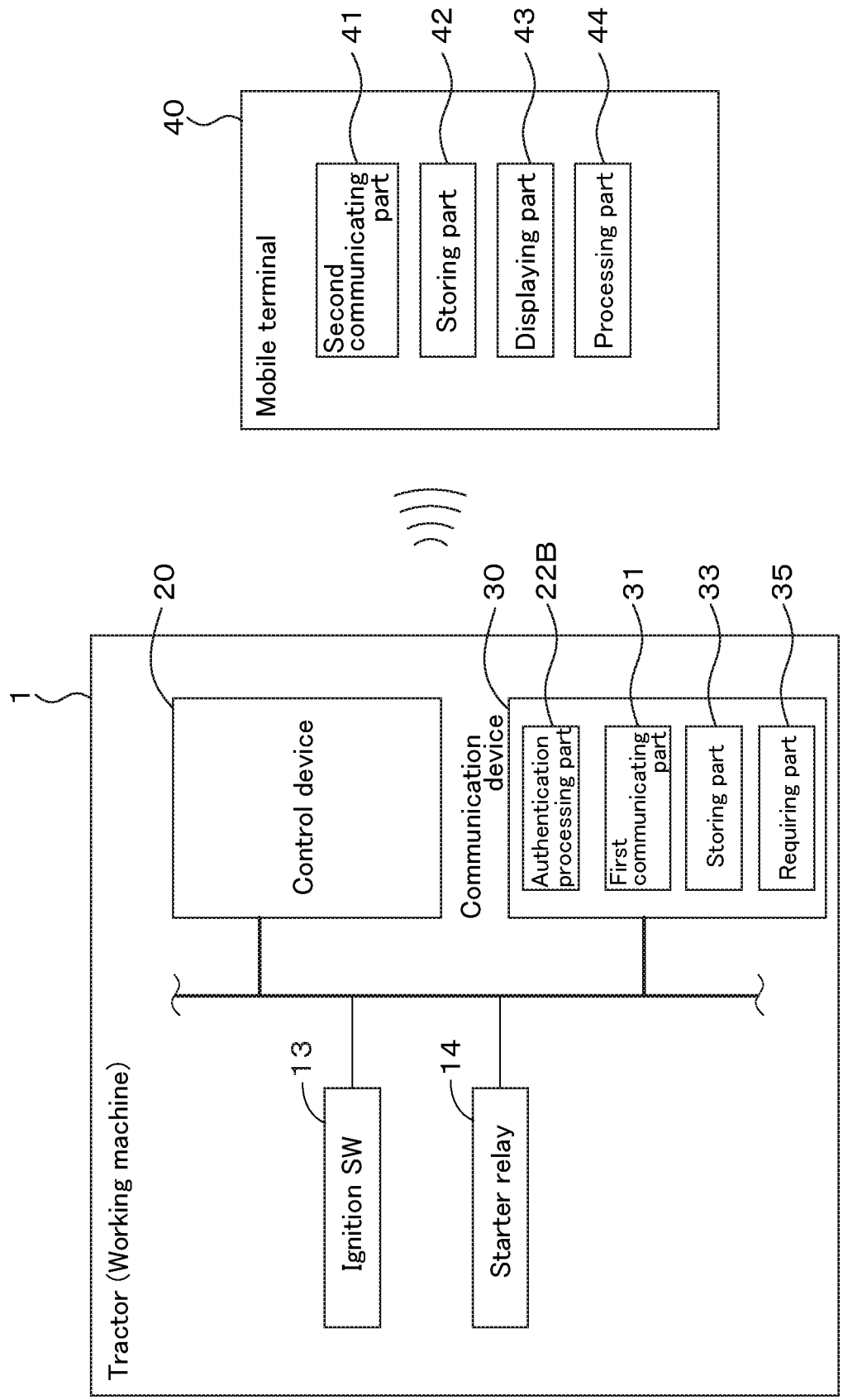
FIG. 10 is a schematic view illustrating an anti-theft system for a working machine according to a fourth embodiment of the present invention.

FIG. 10 shows the anti-theft system for the working machine 1 according to a fourth embodiment of the present invention. In the fourth embodiment, configurations different from those of the first embodiment to the third embodiment will be described. A part of or the whole of the configurations to be disclosed in the fourth embodiment can be applied to the first embodiment to the third embodiment.

As shown in FIG. 10, the communication device 30 includes a storage part 33 and an authentication processing part 22B. The authentication processing part 22B is constituted of electric/electronic components provided in the communication device 30, programs stored in the communication device 30, and the like. The storage part 33 stores the authentication information. The storage authentication information is constituted of characters, numeric numbers, and the like uniquely determined for each of the tractors 1, that is, for each of the control devices 20.

The authentication processing part 22B executes the authentication processing as to whether or not to permit the driving of the prime mover 4 (the driving part). In the authentication processing by the authentication processing part 22B, the external authentication information is compared with the storage authentication information stored in the communication device 30. And, In the case where the external authentication information and the storage authentication information are matched with each other, the authentication processing part 22B notifies the control device 20 that authentication has been established when the external authentication information and the storage authentication information are related (linked) to each other.

For example, the authentication processing part 22B notifies the control device 20 that authentication has been established at the time when the IG-SW 13 is turned from OFF to ON. Upon knowing that the authentication has been established, the control device 20 switches the starter relay 14 from OFF to ON, and thereby driving the prime mover 4.

On the other hand, in the authentication processing by the authentication processing part 22B, in the case where the external authentication information and the storage authentication information are not matched with each other, the authentication processing part 22B notifies the control device 20 that the authentication is not established when the external authentication information and the storage authentication information are not related (linked) to each other. When the control device 20 knows that the authentication is not established, the control device 20 keeps the starter relay 14 in the OFF state, and does not drive the prime mover 4.

Figure 11A:
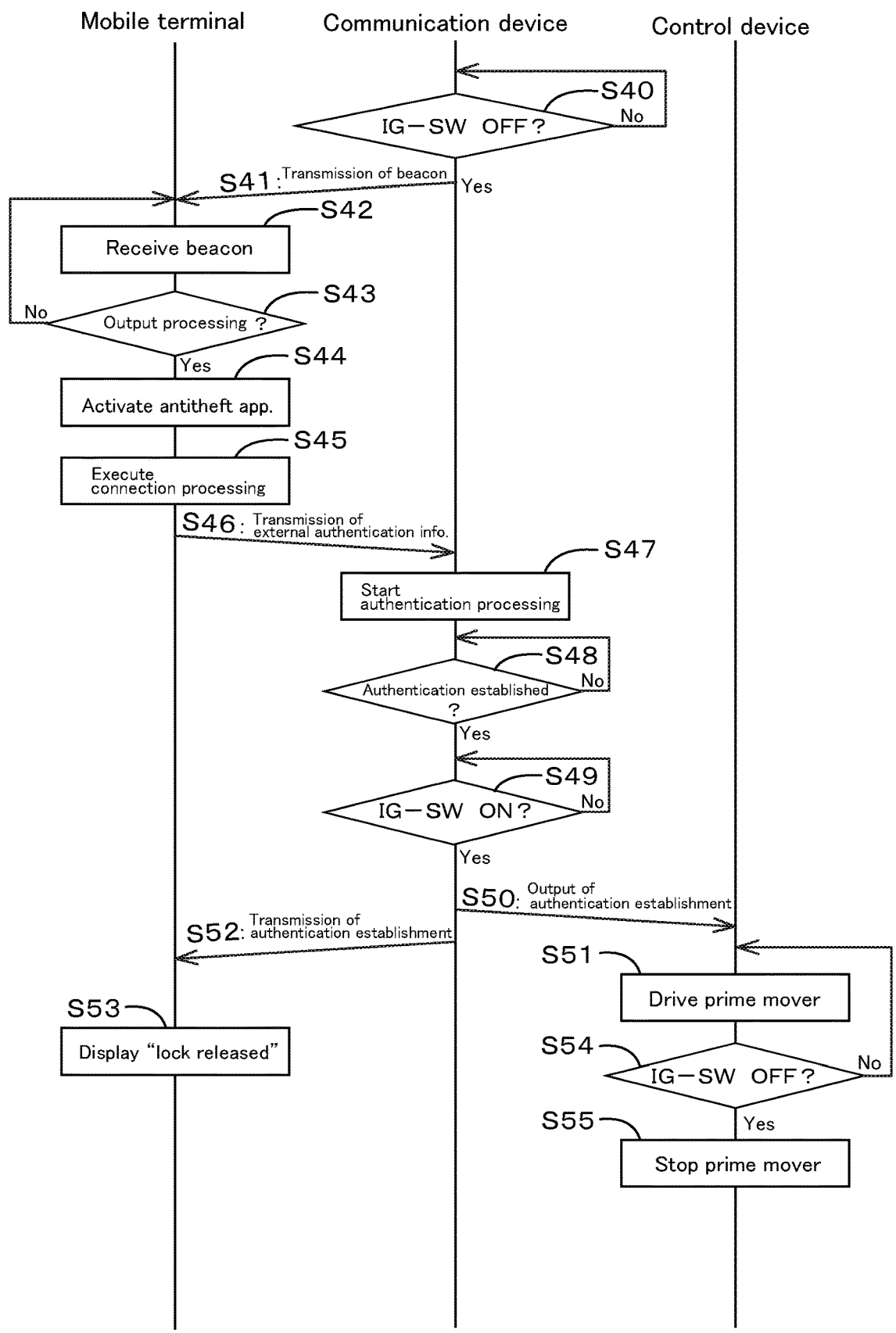
FIG. 11A is a view illustrating a first flowchart of connecting a mobile terminal to a communication device according to the fourth embodiment.

FIG. 11A shows a flowchart of the connection between the mobile terminal 40 and the communication device 30.

As shown in FIG. 11A, the communication device 30 determines whether or not the IG-SW 13 is in the OFF state (S40).

When the IG-SW 13 is in the OFF state (S40, Yes), the first communicating part 31 transmits the beacon B1 to the mobile terminal 40 (S41).

When the second communicating part 41 of the mobile terminal 40 receives the beacon B (S42), the processing part 44 determines, based on the information included in the beacon B, whether or not to execute the output processing (S43).

When determining that the output process is to be executed (Yes in S43), the processing part 44 starts the output process and then activates the anti-theft application (S44).

When the activation of the anti-theft application is completed, the processing part 44 executes the connection processing (S45).

After connecting to the communication device 30 (after reception of the beacon), the mobile terminal 40 (the second communicating part 41) transmits the external authentication information to the communication device 30 (S46).

When the communication device 30 receives the external authentication information, the authentication processing part 22B starts the authentication processing (S47).

That is, when the IG-SW 13 is in the OFF state, the authentication processing part 22B executes authentication processing.

When the authentication of the authentication information is established (S48, Yes) and the IG-SW 13 is switched from the OFF state to the ON state (S49, Yes), the authentication processing part 22B outputs, to the control device 20, that the authentication has been established (S50).

Upon knowing that the authentication has been established, the control device 20 drives the prime mover 4 (S51).

Meanwhile, in the case where the authentication of the authentication information is not established or the case where the IG-SW 13 remains in the OFF state, the authentication processing part 22B does not notify the control device 20 of permission of the authentication. Alternatively, in the case where the authentication of the authentication information is not established, the authentication processing part 22B transmits non-permission of the authentication to the control device 20 when the IG-SW 13 switches from the ON state to the OFF state.

In addition, the communication device 30 notifies the mobile terminal 40 that the authentication has been established (S52).

The displaying part 43 of the mobile terminal 40 displays "lock released" as the machine state 203 (S53).

After driving the prime mover 4, the control device 20 stops driving the prime mover 4 (S55) when the IG-SW 13 is switched from the ON state to the OFF state (S54, Yes).

The anti-theft system for the working machine includes the communication device 30 having the first communicating part 31 and the authentication processing part 22B, the mobile terminal 40 having the second communicating part 41 configured to transmit the authentication information to the first communicating part 31 after receiving the beacon transmitted from the first communicating part 31, and a control device 20 configured to drive the driving part when the permission of the driving part is provided according to the authentication processing.

According to that configuration, the authentication processing part 22B of the communication device 30 can perform the authentication processing after the mobile terminal 40 receives the beacon and then the authentication information is transmitted to the communication device 30. That is, after the mobile terminal 40 receives the beacon and further immediately after the authentication information from the mobile terminal 40 is transmitted to the communication device 30, the authentication processing using the mobile terminal authentication information can be performed on the communication device 30 side.

The first communicating part 31 transmits the beacon to the mobile terminal 40 when the authentication processing part 22B has not yet executed the authentication processing and the ignition switch 13 is in the OFF state, and the authentication processing part 22B executes the authentication processing when the ignition switch 13 is in the OFF state.

According to that configuration, since the authentication information can be already authenticated at the time when the ignition 13 is in the OFF state, it is possible to drive the driving part substantially-simultaneously at the time when the ignition 13 is turned on.

In the above-described embodiment, when the communication device 30 receives the external authentication information, the authentication processing part 22B automatically performs the authentication processing. Alternatively, the authentication processing may be performed based on a command issued from the mobile terminal 40.

The communication device 30 has a requiring part 35. The requiring part 35 is constituted of electric/electronic components provided in the control device 20, programs stored in the control device 20, and the like.

In the case where the communication device 30 obtains the external authentication information transmitted from the mobile terminal 40, the requiring part 35 transmits, to the mobile terminal 40, a signal (a requiring signal) indicating the requiring as to whether or not the authentication processing may be executed by the authentication processing part 22B.

Figure 11B:
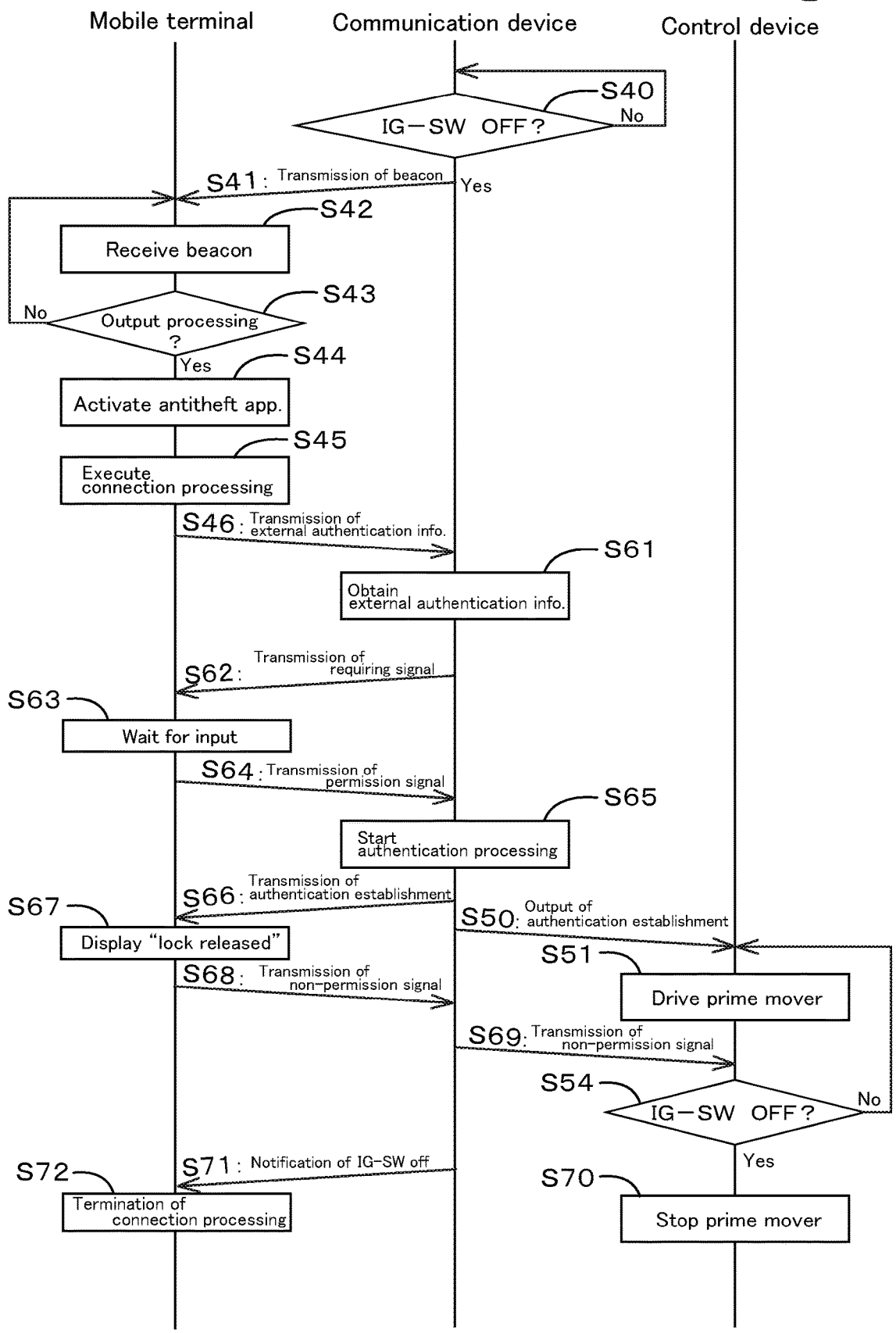
FIG. 11B is a view illustrating a second flowchart of connecting the mobile terminal to the communication device according to the fourth embodiment.

FIG. 11B shows another flowchart of the connection between the mobile terminal 40 and the communication device 30. In FIG. 11B, S40 to S46, S50 to S51, and S54 are the same as those in FIG. 11A.

As shown in FIG. 11B, when the communication device 30 obtains the external authentication information (S61), the requiring part 25 transmits an requiring signal to the mobile terminal 40 (S62).

When the mobile terminal 40 receives the requiring signal, the displaying part 43 displays that the requirement is issued and waits for the input to the setting part 204 (S63).

Meanwhile, note that the default of the setting part 204 is set to the non-permission in the waiting for input to the setting part 204.

When the setting part 204 of the display section 43 switches the non-permission to the permission, the mobile terminal 40 transmits a permission signal indicating the permission to the communication device 30 (S64).

When the communication device 30 obtains the permission signal, the authentication processing is started by the authentication processing part 22B (S65).

When the IG-SW is switched from OFF to ON after the authentication is established, the authentication processing part 22B outputs to the control device 20 that the authentication has been established (S50), and the prime mover 4 is driven (S51).

In addition, when the authentication is established, the communication device 30 transmits to the mobile terminal 40 that the authentication has been established (S66).

The displaying part 43 of the mobile terminal 40 displays the "lock released" as the machine state 203 (S67).

When the setting is changed from the permission to the non-permission in the setting part 204 of the displaying part 43, the mobile terminal 40 transmits the non-permission signal indicating the non-permission to the communication device 30 (S68).

After receiving the non-permission signal, the communication device 30 outputs the non-permission signal to the control device 20 (S69).

When the control device 20 obtains the non-permission signal and the IG-SW 13 is switched from the ON state to the OFF state (S54, Yes), the control device 20 stops the driving of the prime mover 4 (S70).

The communication device 30 notifies the mobile terminal 40 that the IG-SW 13 is turned off (S71).

After knowing that the IG-SW 13 is in the OFF state, the mobile terminal 40 terminates the connection processing after a predetermined time or more passed (S72).

In the case where the mobile terminal 30 provides the permission, the authentication processing part 22B executes the authentication processing after the communication device 30 receives the authentication information. Thus, it is possible to confirm with an operator whether or not the operator requires the authentication processing (requires the driving of the prime mover 4) in the case where the operator or the like possesses the mobile terminal 40 or the like. And then, the prime mover 4 can be driven. The timing to start driving the prime mover 4 can be set by the operator.

Fifth Embodiment

FIG. 12 shows an anti-theft system for the working machine 1 according to a fifth embodiment of the present invention. In the fifth embodiment, configurations different from those of the first embodiment to the fourth embodiment will be explained. A part of or the whole of the configurations to be disclosed in the fifth embodiment can be applied to the first embodiment to the fourth embodiment.

The communication device 30 has a collecting part 32. The collecting part 32 is composed of electric/electronic components provided in the communication device 30, programs stored in the communication device 30, and the like. The collecting part 32 is configured to collect machine information on the working machine.

For example, the communication device 30 is connected to the devices (the control device 20, the display device, the detection device such as a sensor or the like) provided in the tractor 1, and the collecting portion 32 collects various signals (various types of data) flowing in the communication line L1 as the machine information.

For example, the collection unit 32 collects, as the machine information, an engine revolving speed detected by an engine revolutions sensor, a vehicle speed detected by a vehicle speed detecting sensor, a PTO revolutions speed detected by a PTO detecting sensor, and the like. The collecting part 32 may collect the information on the failure and the warning of the devices mounted on the tractor 1 as machine information, or may collect the set values and the like of the devices of the tractor 1 as the machine information.

In addition, in the case where a position detecting device is provided in the tractor 1, the position detecting device being configured to detect a position (the latitude and the longitude) on the basis of a signal from a positioning satellite or the like, the collecting part 32 may collects the position (the position of the working machine) as the machine information, the position being detected by the position detecting device. Meanwhile, the machine information may be any information as long as the information relating to the tractor 1.

The storage part 33 temporarily stores the machine information collected by the collecting part 32. The machine information temporarily stored in the storage part 33 is transmitted to the mobile terminal 40 by the communication device 30 (the first communicating part 31). For example, in the case where the communication between the communication device 30 and the mobile terminal 40 is established after the mobile terminal 40 detects the beacon B, the communication device 30 transmits, to the mobile terminal 40, the machine information stored in the storage part 33.

In the case where the setting part (the switch) 204 permits the authentication processing, that is, in the case where the operator performs the lock releasing operation with use of the mobile terminal 40, the mobile terminal 40 may request the communication device 30 to transmit the machine information, and the communication device 30 may transmit the machine information stored in the storage part 33 to the mobile terminal 40 in response to the request for the machine information.

In addition, the machine information obtained by the mobile terminal 40 can be transmitted to the management device 50 such as a server. That is, the second communicating part 41 of the mobile terminal 40 transmits the machine information received by the mobile terminal 40 to the management device 50. The management device 50 stores machine information for each of the tractors 1.

According to the above embodiments, not only the anti-theft processing but also the processing to obtain the machine information of the tractor 1 can be performed, and thus both of the anti-theft and the collection of the machine information can be achieved.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. An anti-theft system for a working machine, comprising:
   a communication device disposed on the working machine, the communication device having
      a first storage to store a first activation information and a first authentication information;
      a first communicator to send a beacon containing the first activation information as a broadcast signal to outside of the working machine;
   a mobile terminal having:
      a second storage to store a second activation information and a second authentication information; and
      a second communicator to send the second authentication information to the communication device when the first activation information matches with or corresponds to the second activation information; and
   a control device disposed on the working machine, the control device having
      an authentication processor to execute an authentication processing that authenticates the mobile terminal to permit the mobile terminal to drive a driving portion of the working machine when the second authentication information matches with or corresponds to the first authentication information,
   wherein the control device has a requiring circuit to require execution of the authentication processing,
   wherein the mobile terminal has a display to display a setting circuit, the setting circuit being configured to determine whether to permit the requiring, wherein the requiring circuit sends a requiring signal to the communication device when the control device obtains the second authentication information, the requiring signal indicating requirement for the authentication processing, and wherein the authentication processor executes the authentication processing when the permission is set to the setting circuit.

2. The anti-theft system for the working machine according to claim 1, wherein the first communicator sends the beacon to the mobile terminal when an ignition switch disposed on the working machine is turned off before the authentication processor executes the authentication processing, and wherein the authentic processor executes the authentic processing when the ignition switch is turned on.

3. The anti-theft system for the working machine according to claim 1, wherein the authentication processor executes the authentication processing when the mobile terminal provides a permission after the communication device receives the second authentication information.

4. An anti-theft method for a working machine, comprising:

storing a first activation information and a first authentication information in a first storage of a communication device disposed on the working machine;

storing a second activation information and a second authentication information in a second storage of a mobile terminal;

sending a beacon containing the first activation information as a broadcast signal from the communication device to outside of the working machine;

sending the second authentication information from the mobile terminal to the communication device when the first activation information matches with or corresponds to the second activation information; and executing, by a control device disposed on the working machine, an authentication processing that authenticates the mobile terminal to permit the mobile terminal to drive a driving portion of the working machine when the second authentication information matches with or corresponds to the first authentication information, wherein the control device has a requiring circuit to require execution of the authentication processing, wherein the mobile terminal has a display to display a setting circuit, the setting circuit being configured to determine whether to permit the requiring, wherein the requiring circuit sends a requiring signal to the communication device when the control device obtains the second authentication information, the requiring signal indicating requirement for the authentication processing, and wherein the authentication processor executes the authentication processing when the permission is set to the setting circuit.

5. An anti-theft system for at least one working machine, the anti-theft system comprising a communication device and a control device both provided on the working machine, and a mobile terminal, wherein the communication device includes a first storage to store a first activation information and a first authentication information, and a first communicator to send a beacon containing the first activation information as a broadcast signal to outside of the working machine;

the mobile terminal includes a second storage to store a second activation information and a second authentication information, and a second communicator to send the second authentication information to the communication device when the second activation information matches with or corresponds to the first activation information; and the control device includes an authentication processor to authenticate the mobile terminal and allow the mobile terminal to drive a driving portion of the working machine when the second authentication information matches with or corresponds to the first authentication information, wherein the control device has a requiring circuit to require execution of the authentication processing, wherein the mobile terminal has a display to display a setting circuit, the setting circuit being configured to determine whether to permit the requiring, wherein the requiring circuit sends a requiring signal to the communication device when the control device obtains the second authentication information, the requiring signal indicating requirement for the authentication processing, and wherein the authentication processor executes the authentication processing when the permission is set to the setting circuit.

6. The anti-theft system according to claim 5, wherein the mobile terminal includes a processing part and a displaying part, and when the first activation information matches with or corresponds to the second activation information, the processing part activates an anti-theft program, the displaying part displays an anti-theft screen through the anti-theft program, and the second communicator sends the second authentication information to the communication device in accordance with the anti-theft program.

7. The anti-theft system according to claim 6, which is used for a plurality of the working machines, each of the working machines comprising the communication devices, wherein the second communicator receives the beacons containing the first activation information from each of the communication devices; and the displaying part is configured to allow a user to select any one of the working machines through the anti-theft screen, to which the second communicator sends the second authentication information.

8. The anti-theft system according to claim 5, wherein the control device controls the communication device to inform to the mobile terminal that the authentication processor authenticates the mobile terminal when the second authentication information matches with or corresponds to the first authentication information.

9. The anti-theft system according to claim 5, wherein the first communicator sends the beacon to the mobile terminal when an ignition switch disposed on the working machine is turned off before the authentication processor executes the authentication processing, and the authentic processor authenticates the mobile terminal when the ignition switch is turned off.

10. The anti-theft system according to claim 5, wherein the authentication processor authenticates the mobile terminal when the mobile terminal provides a permission and after the communication device receives the second authentication information.

11. An anti-theft method for a working machine, comprising:
- sending a beacon containing a first activation information stored in a communication device from the communication device to outside of the working machine;
- sending a second authentication information from a mobile terminal to the communication device when the first activation information matches with or corresponds to a second activation information stored in the mobile terminal; and
- authenticating the mobile terminal to allow the mobile terminal to drive a driving portion of the working machine when the second authentication information matches with or corresponds to a first authentication information stored in the communication device,
- wherein a control device for the authenticating has a requiring circuit to require execution of an authentication processing,
- wherein the mobile terminal has a display to display a setting circuit, the setting circuit being configured to determine whether to permit requiring execution of the authentication processing,
- wherein the requiring circuit sends a requiring signal to the communication device when the second authentication information is obtained, the requiring signal indicating requirement for the authentication processing,
- and wherein the authentication processor executes the authentication processing when the permission is set to the setting circuit.

12. The anti-theft method according to claim 11, further comprising:
- when the first activation information matches with or corresponds to the second activation information,
- activating an anti-theft program;
- displaying an anti-theft screen through the anti-theft program; and
- sending the second authentication information to the communication device in accordance with the anti-theft program.

13. The anti-theft method according to claim 11, further comprising informing to the mobile terminal that the authentication processor authenticates the mobile terminal when the second authentication information matches with or corresponds to the first authentication information.

* * * * *